US011197741B2

(12) United States Patent
Alikhani et al.

(10) Patent No.: US 11,197,741 B2
(45) Date of Patent: Dec. 14, 2021

(54) ULTRA-ADAPTABLE ORTHODONTIC SYSTEM

(71) Applicant: New York University, New York, NY (US)

(72) Inventors: Mani Alikhani, Hoboken, NJ (US); Cristina Teixeira, New York, NY (US); Serafim Oliveira, Viseu (PT); Chinapa Sangsuwon, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 347 days.

(21) Appl. No.: 16/082,888

(22) PCT Filed: Mar. 9, 2017

(86) PCT No.: PCT/US2017/021608
§ 371 (c)(1),
(2) Date: Sep. 6, 2018

(87) PCT Pub. No.: WO2017/156294
PCT Pub. Date: Sep. 14, 2017

(65) Prior Publication Data
US 2019/0076218 A1     Mar. 14, 2019

Related U.S. Application Data

(60) Provisional application No. 62/305,641, filed on Mar. 9, 2016.

(51) Int. Cl.
*A61C 7/14*     (2006.01)
*A61C 7/28*     (2006.01)
*A61C 7/12*     (2006.01)

(52) U.S. Cl.
CPC .......... *A61C 7/14* (2013.01); *A61C 7/12* (2013.01); *A61C 7/141* (2013.01); *A61C 7/28* (2013.01); *A61C 7/285* (2013.01)

(58) Field of Classification Search
CPC .. A61C 7/14; A61C 7/12; A61C 7/125; A61C 7/28; A61C 7/285–287; A61C 7/20; A61C 7/141
See application file for complete search history.

(56) References Cited

U.S. PATENT DOCUMENTS 3,946,488 A    3/1976   Miller et al.
4,353,692 A    10/1982   Karrakussoglu
(Continued)

FOREIGN PATENT DOCUMENTS

EP            0714639 A2 *   6/1996  ............. A61C 7/125
WO    WO-2018106527 A2 *   6/2018  ............... A61C 7/08

*Primary Examiner* — Jacqueline T Johanas
*Assistant Examiner* — Shannel Nicole Belk
(74) *Attorney, Agent, or Firm* — Fay Kaplun & Marcin, LLP

(57) ABSTRACT

An orthodontic bracket may include a housing portion having a first channel extending from a first end to a second end through the housing portion. The first channel is configured to slidably receive an archwire therethrough. The bracket also include a body portion configured to be received within the housing portion. The housing portion is configured to rotatably mount to the body portion about a first axis and a second axis. The first axis may be in an apico-coronal direction of the tooth. The second axis may be in a buccopalatal direction of the tooth. The bracket further includes a base portion configured to attach to a surface of the tooth. The body portion is configured to slidably mount on the base portion along the apico-coronal direction of the tooth.

15 Claims, 13 Drawing Sheets

(56) References Cited

U.S. PATENT DOCUMENTS

| | | | |
|---|---|---|---|
| 4,867,678 A | 9/1989 | Parker | |
| 5,302,121 A | 4/1994 | Gagin | |
| 5,595,484 A | 1/1997 | Orikasa et al. | |
| 5,954,502 A | 9/1999 | Tuenge et al. | |
| 7,431,586 B1 | 10/2008 | Silverman | |
| 7,731,496 B2 | 6/2010 | Minium | |
| 7,775,794 B2* | 8/2010 | Duran Von Arx | A61C 7/125 433/10 |
| 8,113,828 B1 | 2/2012 | Greenfield | |
| 8,371,846 B2 | 2/2013 | Kishi | |
| 8,550,814 B1 | 10/2013 | Collins | |
| 2008/0293005 A1 | 11/2008 | Rahlis et al. | |
| 2011/0300502 A1 | 12/2011 | Kishi | |
| 2011/0311935 A1 | 12/2011 | Dumas | |
| 2012/0315593 A1 | 12/2012 | Ramos-de-la Pena et al. | |
| 2013/0022935 A1 | 1/2013 | Ramos de la Pena | |
| 2013/0078595 A1 | 3/2013 | Solano Reina et al. | |
| 2013/0323667 A1 | 12/2013 | Staley | |
| 2014/0045137 A1* | 2/2014 | Reina | A61C 7/285 433/9 |
| 2014/0065568 A1 | 3/2014 | Rahimi | |
| 2014/0205962 A1 | 7/2014 | Damon et al. | |
| 2015/0017597 A1* | 1/2015 | Reina | A61C 7/141 433/10 |
| 2015/0157422 A1 | 6/2015 | Cosse et al. | |
| 2015/0230887 A1* | 8/2015 | Damon | A61C 7/16 433/9 |
| 2016/0143707 A1* | 5/2016 | Rahimi | A61C 7/14 433/16 |
| 2018/0168777 A1* | 6/2018 | Damon | A61C 7/148 |
| 2018/0221114 A1* | 8/2018 | Cosse | A61C 7/02 |
| 2019/0167385 A1* | 6/2019 | Alikhani | A61C 7/28 |

* cited by examiner

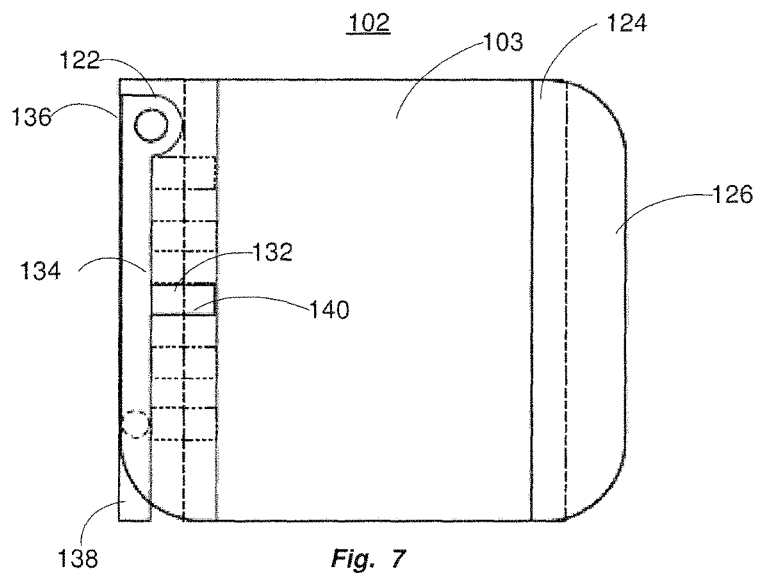
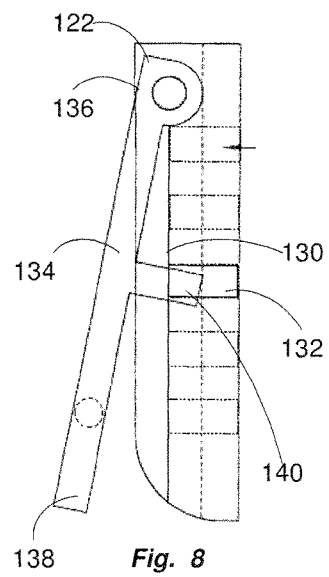
Fig. 7    Fig. 8
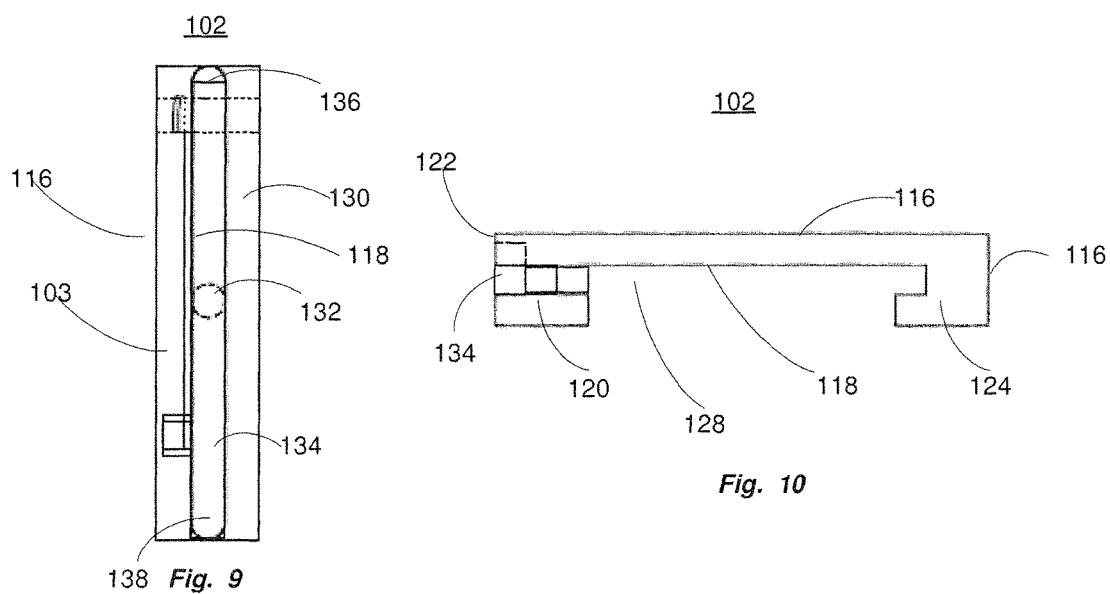
Fig. 9    Fig. 10

100

100

100

100

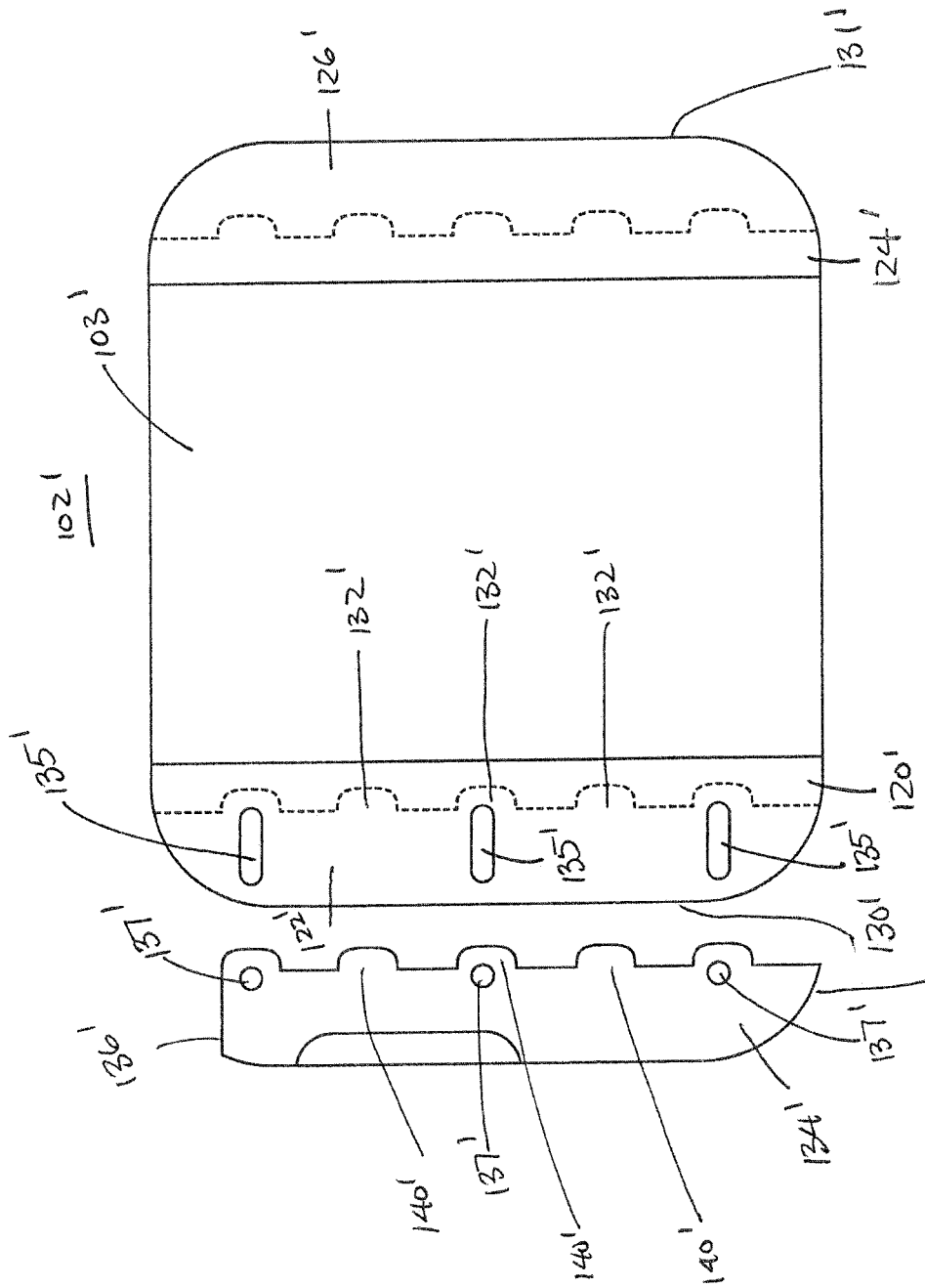

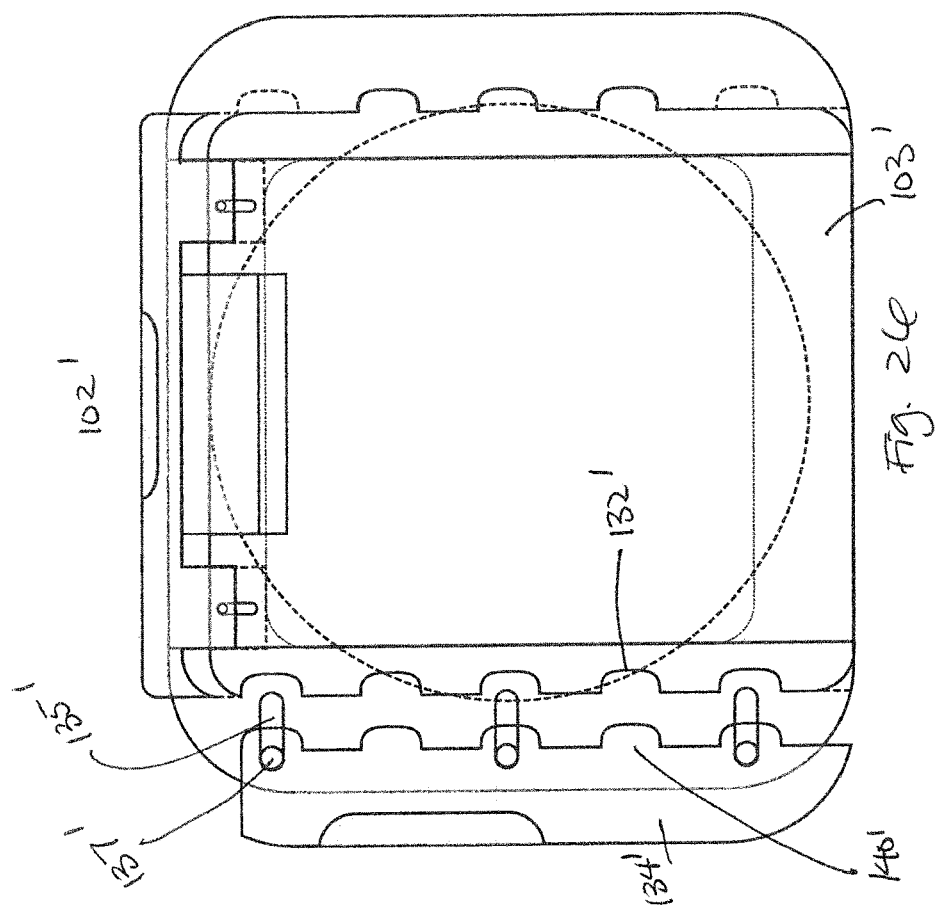
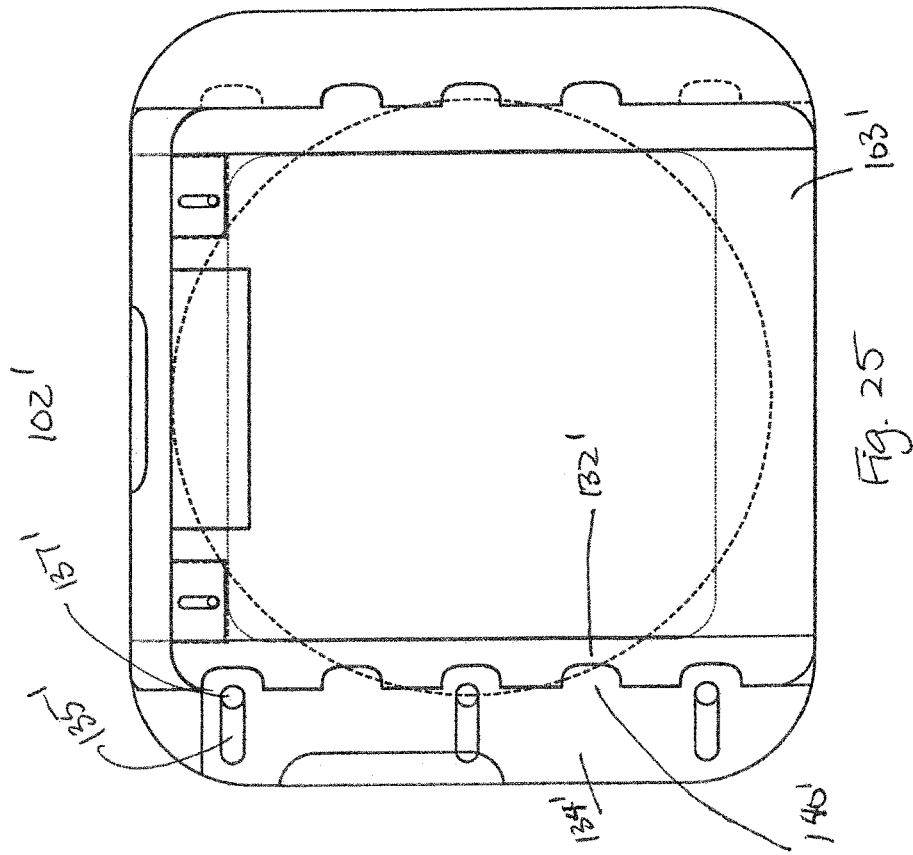

ULTRA-ADAPTABLE ORTHODONTIC SYSTEM

PRIORITY CLAIM

This application is a 371 application of PCT Patent Application Serial No. PCT/US2017/021608 filed Mar. 9, 2017, which claims priority to U.S. Provisional Patent Application Serial No. 62/305,641 filed. Mar. 9, 2016, the entire contents of which is hereby incorporated by reference herein.

BACKGROUND

Braces have been the primary method of treating orthodontic issues such as, for example, generalized or localized spacing, expansion of the dental arch, constriction of the dental arch, closure of extraction spaces, opening of spaces for implant or fixed prosthesis, moving midlines, correction of overjet (i.e., distance between upper and lower anterior teeth) and protraction and retraction of the whole dentition. Orthodontics treatment is based on interaction between wire and fixed orthodontic brackets (braces or attachments) that are attached by different methods to the surface of a tooth. Upon alignment of the teeth, metal wires are inserted into orthodontic brackets (braces or attachments), which are adhered to the teeth. The wire receives a small deflection from braces and produces the desire forces and/or moments to move tooth. The teeth are then moved toward or away from one another, along the wire, to close or open spaces therebetween, as required.

Conventional orthodontic brackets (braces or attachments) maintain fixed configurations and cannot be adjusted to alter the forces and/or moments applied to the teeth. Therefore, once conventional orthodontic brackets are attached to the surface of the teeth, the only way to alter the forces applied to the teeth and change their configurations is to first, detach the conventional orthodontic brackets from the teeth, adjust their configuration, and then reattach the adjusted conventional orthodontic brackets back to the surface of the teeth. This adjustment procedure requires numerous steps, and frequent and repeat detachment and reattachment of brackets to the surface of the teeth may be detrimental to the enamel of the teeth.

Such conventional orthodontic brackets cannot be easily manipulated to adjust its orientation and thus, suffer a number of deficiencies. First, it is very difficult to predict the correct position of braces that can lead to correct final position of the tooth at the beginning of treatment. Therefore, even with the best attempts of the clinician there is always need for adjustment (reattachment) over the course of the treatment. Second, even if the correct position of the braces is known from the beginning, it is very difficult to place the bracket inside the mouth in the correct position due to lack of proper vision from every angle and a mistake in position can occur. In the majority of the times, the mistake in positioning will need to be corrected. Third, in some circumstances, the teeth may be suffer from malalignment such that placement of the orthodontic brackets (braces or attachments) may not be possible, and thus, the brackets will need to be detached and replaced a number of times during the course of orthodontic treatment.

The configuration and orientation of orthodontic brackets (braces or attachments) may be important to the mechanical forces applied to teeth for orthodontic treatment. To produce enough force to generate movement, the wire, which is inserted through the brackets, needs to have sufficient deflection as it is inserted through the brackets that are mounted on the teeth of a patient. Therefore, flexible wires have very limited use in conventional orthodontic treatment because early in the treatment process, the flexible wire may not have sufficient deflection as it is inserted into the orthodontic brackets mounted on the teeth, and therefore, will not be able to produce sufficient force onto the teeth for orthodontic treatment.

Therefore, the need for braces that can be adjusted in different position based on the need of the clinician and requirements of treatment at every visit, is clear. This would be the ideal appliance.

SUMMARY OF THE INVENTION

In accordance with the foregoing objectives and others, one embodiment of the present invention provides an orthodontic bracket for a tooth. The bracket comprises a housing portion having a first groove extending from a first end to a second end through the housing portion. The first groove is configured to slidably receive an archwire therethrough. The bracket also comprises a body portion configured to be received within the housing portion. The housing portion is configured to rotatably mount to the body portion about a first axis, a second axis, and a third axis. The first axis is in an apico-coronal direction of the tooth, the second axis is in a buccopalatal direction of the tooth, and the third axis being in a mesial-distal direction of the tooth. The bracket may further comprise a base portion configured to attach to a surface of the tooth. The body portion may be further configured to slidably mount on the base portion along the apico-cornal direction of the tooth. The body portion may also be further configured to reversibly extend and retract in a buccopalatal direction.

In accordance with another aspect of the present application, an orthodontic bracket for a tooth is provided. The bracket comprises a movable portion having a groove extending from a first end to a second end through the movable portion, the groove configured to slidably receive an archwire therethrough. The bracket also comprises a first adjustable mechanism configured to rotatably adjust the movable portion about a first axis in an apico-coronal direction of the tooth, a second axis in a buccopalatal direction of the tooth, and a third axis in a mesial-distal direction of the tooth. The bracket further comprises a base portion configured to attach to a surface of the tooth. The movable portion is reversibly attachable to the base portion. Additionally, the bracket may comprise a second adjustable mechanism configured to slidably adjust the movable portion along the apico-coronal direction of the tooth. The orthodontic bracket may further comprise a third mechanism configured to reversibly extend and retract the movable portion in a buccopalatal direction.

In accordance with a further embodiment of the present application, an orthonotic system is provided. The orthodontic system comprises a plurality of identical orthodontic brackets. Each bracket comprises (i) a housing portion having a first groove extending from a first end to a second end through the housing portion, and (ii) a body portion configured to be received within the housing portion. The housing portion is configured to rotatably mount to the body portion about a first axis, a second axis, and a third axis. The first axis being in an apico-coronal direction of the tooth, the second axis being in a buccopalatal direction of the tooth, and the third axis being in a mesial-distal direction of the tooth. Each of the plurality of is also configured to be attached to a tooth of a patient. The orthodontic system further comprises a flexible archwire configured to be slidably received within the first groove of the housing portion. In some embodiments, each of the plurality of brackets is configured to be attached to a lingual surface of the corresponding tooth of the patient. In other embodiments, each of the plurality of brackets is configured to be attached to a labial surface of the corresponding tooth of the patient. The orthodontic system may further comprise an adjustment device configured to rotatably adjust the housing portion of each of the plurality of brackets about the first, second and third axes of each of the plurality of brackets.

These and other aspects of the invention will become apparent to those skilled in the art after a reading of the following detailed description of the invention, including the figures and appended claims.

BRIEF DESCRIPTION OF THE FIGURES

FIG. 7 shows a front view of a base portion of the exemplary orthodontic bracket device of FIG. 1.

FIG. 8 shows a front view of a locking lever of the base portion of FIG. 7 in an open position.

FIG. 9 shows a side view of the base portion of the exemplary orthodontic bracket device of FIG. 1 where the locking lever is in a closed position.

FIG. 10 shows a top view of the base portion of the exemplary orthodontic bracket device of FIG. 1.

FIG. 24 shows an exploded view of a base portion of an alternative exemplary orthodontic bracket device.

FIG. 25 shows a front view of the base portion of the alternative exemplary orthodontic bracket device of FIG. 24 in a closed configuration.

FIG. 26 shows a front view of the base portion of the alternative exemplary orthodontic bracket device of FIG. 24 in an open configuration.

DETAILED DESCRIPTION

Figure 1:
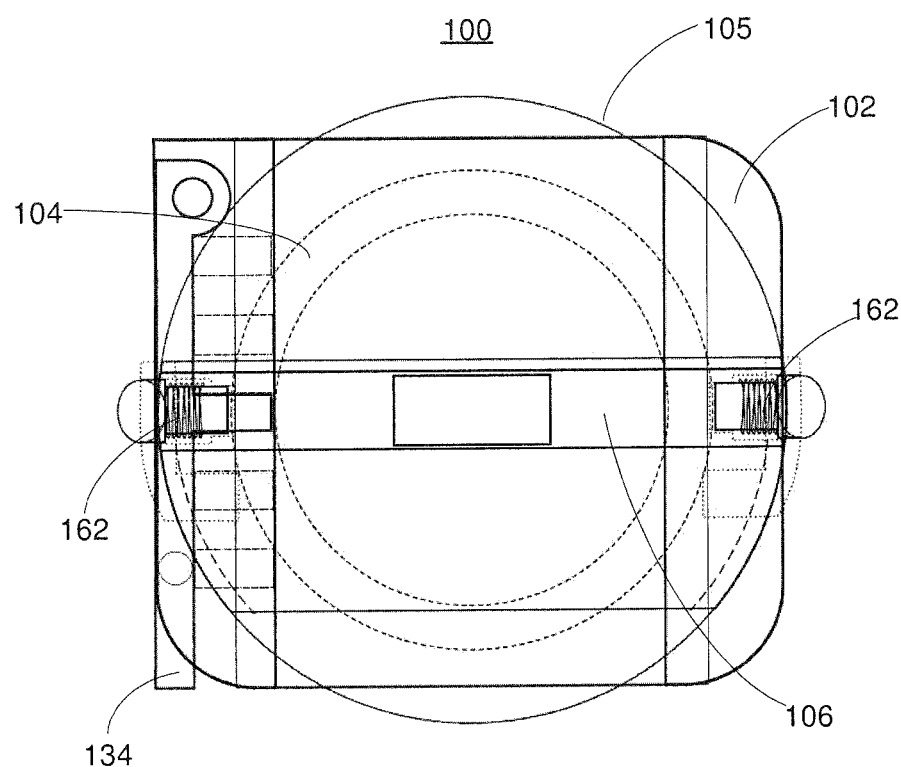
FIG. 1 shows a front view of an orthodontic bracket device according to an exemplary embodiment of the present invention.
Figure 2:
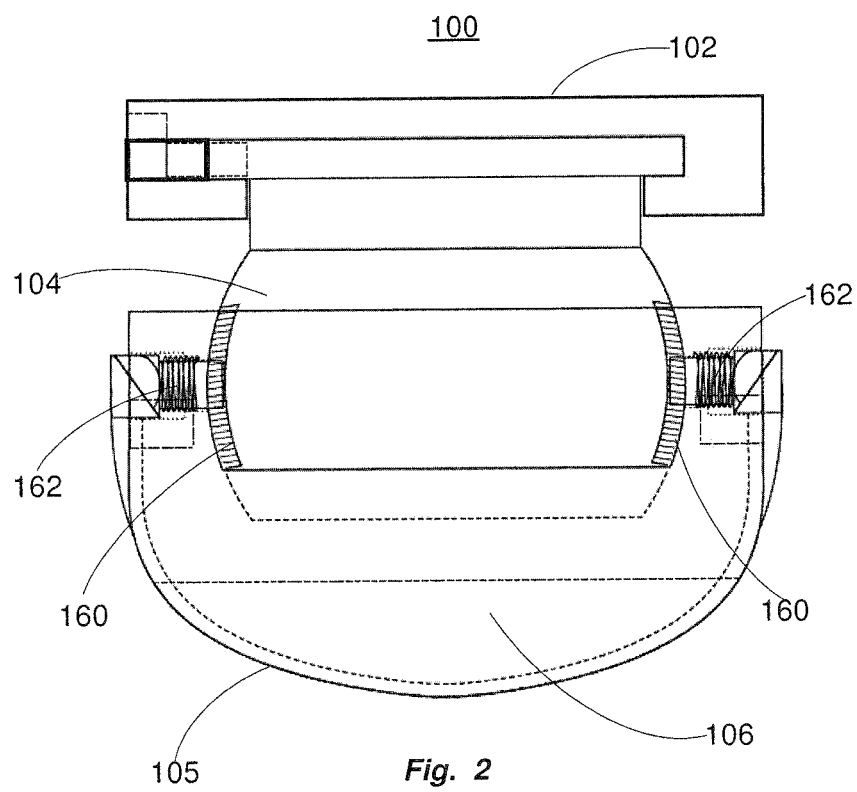
FIG. 2 a top view of the exemplary orthodontic bracket device of FIG. 1.

The present invention generally includes an orthodontic bracket for a tooth that provides for adjustability of the positioning and orientation of the bracket after attachment of the bracket to the tooth. In particular, the orthodontic bracket may be independently adjustable, after attachment to the tooth, in three dimensions and/or orientations, e.g., the bracket may be slidable along and/or rotatable around one or more axis. The exemplary embodiments described herein may be suitable for adjusting the positioning of the brackets and thereby transferring a force to the teeth to provide for movement of the teeth for clinical orthodontics. The exemplary embodiments described herein provide numerous benefits over existing devices and methods for orthodontic alignment of teeth. For example, it is believed that the exemplary embodiments of orthodontic brackets provide for enhanced adjustability and will therefore significantly advance the practice of clinical orthodontics.

Conventional orthodontic brackets require the use of differently angled or aligned brackets for each tooth. Each conventional bracket may include a built-in angulation/torque/tip or offset (also known as fixed prescription) that provides for an orientation that is specific for each tooth. Therefore, a specific and customized conventional orthodontic bracket for each tooth is required for orthodontic alignment. In addition, some orthodontists may elect to use additional conventional varieties of orthodontic brackets to provide stage-wise adjustments for certain types of patient situations, for example, extraction in comparison to non-extraction as part of the orthodontic alignment and/or treatment. Moreover, some clinicians, depending on the type of treatment philosophy to which they subscribe, may elect to use additional varieties in bracket prescription to provide for stage-wise adjustments for orthodontic adjustments. All of these additional variations to orthodontic treatment require use of additional varieties in bracket prescription, and therefore, additional custom aligned conventional orthodontic brackets are needed for each variation. All of these variations requires the manufacture and production of customized or a large variety of conventional orthodontic brackets, and that all of these variations be maintained in inventory and readily available for use by an orthodontist.

Additionally, it is difficult for a clinician to accurately place a conventional orthodontic bracket, where each bracket is configured to a specific and fixed prescription. Conventional orthodontic brackets can often be inaccurately placed for a number of reasons, e.g., clinician unable to easily reach certain portions of the teeth, clinician unable to see the desired surfaces of the teeth, malpositioning of a tooth, etc. In addition, under certain circumstances, the clinician may elect to provide stage-wise adjustments for certain types of patient situations. Therefore, as the orthodontic treatment progresses, clinicians often would need to remove the conventional bracket from the teeth to either reposition it or replace it with a bracket having a differently configuration (e.g., having a different fixed prescription). Repeat attachment and detachment of orthodontic brackets to the surface of the teeth is time consuming, expensive and may damage the enamel of the teeth.

There are a number of methods for addressing some of the deficiencies of conventional orthodontic brackets: (1) repositioning; (2) indirect bonding; and/or (3) wire compensation. First, conventional orthodontic brackets need to be repositioned if the placements are not in the desired positions. If the clinician makes a mistake, he would need to removed the braces and reposition them directly. This repositioning process carries the risk of making a mistake again and a possibility of damaging the enamel due to multiple removal and replacement. Secondly, the clinician may utilize an indirect bonding process to more accurately position conventional orthodontic brackets. In particular, the clinician may position the braces outside of the mouth on a model where he/she has better view of the teeth and then transfer the braces into the teeth in the mouth. This indirect bonding procedure is very time consuming and depending on the severity of malalignment, there maybe still need for readjustment. Thirdly, the orthodontist may bend a rigid archwire connecting a plurality of conventional orthodontic brackets to alter a force and/or moment applied to the teeth to compensate for mistakes in attaching and positioning conventional orthodontic brackets. For example, the clinician may bend the wire to compensate for the mistake in positioning the attachment. This procedure is not very precise and it is very time consuming. The magnitude of time necessary to produce required bends is so significant that some companies started to offer their services to produce the required bends after receiving a scan from the current position of the braces inside the mouth, which can significantly add to the cost for the patient and in itself has many limitations. To solve this problem one solution is adding exaggerated bends in the rigid wire, which can significantly increase the chair side time for clinician, and discomfort for the patient since calibration of force produced by a more rigid wire is more difficult and the possibility of mistakes increase significantly. To be able use the flexible wire, without adding bends to rigid wires, repositioning the bracket is the solution, but with small movements of the tooth the magnitude of force and moments decrease significantly which require constant repositioning of the braces.

The exemplary embodiments of orthodontic brackets described herein provide for enhanced adjustability such that any readjustments to the angulation/torque/tip or offset of the bracket may be made by manipulating all or parts of the bracket itself, while it is attached to the tooth. In particular, the readjustments may be made in at least three different orientations to allow for repositioning of the bracket after attachment and/or during the course of orthodontic treatment.

The exemplary embodiments described herein provide for a universal orthodontic bracket having enhanced adjustability. For example, the orthodontic brackets described herein may be adjustable based on the need of the patient and the clinician's treatment philosophy, without requiring the use of a large inventory of orthodontic brackets and/or comprise the results of the treatment. In some embodiments, the exemplary orthodontic brackets described herein may include two different varieties: one variety for posterior teeth, and a second variety for anterior teeth. In particular, one variety of the exemplary orthodontic brackets described herein may be configured to be used with the patient's posterior teeth (e.g., canine, premolar, and/or molar teeth), whereas a different variety of the exemplary orthodontic brackets may be configured to be used with the patient's anterior teeth. In certain embodiments, the variety of exemplary orthodontic brackets may be configured to be used with the patient's posterior teeth may include one or more gears within the bracket that engages an archwire inserted therethrough.

In addition, the exemplary embodiments described herein may be used with an archwire to provide a force or a moment for adjustment of teeth. In conventional orthodontic treatment, the conventional brackets are used in conjunction with one or more archwires, typically several wires, forming a fixed structure. In particularly, the shape of the fixed structure of the conventional orthodontic braces may be manipulated, i.e., by manipulating the archwires, to impart a force and/or moment to the teeth of the patient. Specifically, the fixed structure may be manipulated by changing wire size and/or adding bends to the archwire to produce a desired force and/or moment to the teeth. The archwires used in conjunction with conventional brackets may have different sizes (e.g., from about 0.012 to about 0.020 inches), shapes (e.g., round or rectangular), and materials (e.g., Nitinol, stainless steel, or titanium-molybdenum alloy (TMA)) to provide the required force and/or moment for alignment of teeth of a patient. Contrary to conventional orthodontic brackets, the exemplary embodiments of an orthodontic bracket described herein imparts a force and/or moment to the teeth of the patient by adjusting the angulation/torque/tip or offset of the bracket. For example, the exemplary embodiments of orthodontic brackets may be used in conjunction with an archwire. A force and/or moment may be activated by adjustments to the exemplary orthodontic brackets instead of manipulating the archwires. For example, the angulation/torque/tip or offset of the bracket may be adjusted at each visit to the orthodontist to provide the desired force and/or moment. Therefore, conventional techniques require frequent replacement and/or manipulation of one or more archwires to change the force and/or moment applied to the teeth of the patient.

Contrary to conventional orthodontic braces, the exemplary embodiments of orthodontic brackets described herein may be manipulated and readjusted to provide the desired force and/or moment to the teeth. The adjustability of the exemplary embodiments of orthodontic braces described herein allows for ease of activation of a force and/or moment to the teeth by the orthodontist. This ease of activation may reduce the time that the patient spends in the orthodontist's office, significantly reduce patient discomfort, and/or increase orthodontist office's productivity. The exemplary embodiments described herein may also allow the clinician to constantly improve the position of the braces based on the need of the patient as treatment gradually progresses. In addition, the exemplary embodiments described herein may be use in with flexible archwires, e.g., nitinol or nickel-titanium wires, because adjusting the exemplary orthodontic brackets, not the archwire, activates the forces or momentum that is applied to the teeth. Therefore, the error prone and imprecise process of wire bending is eliminated from orthodontic treatment. Rather, the exemplary embodiments describe herein allow for use of flexible wires in orthodontic treatment for a longer period of time, and thereby provides a more gradual change in the forces applied to the teeth, which allows for greater comfort to the patient. The exemplary embodiments of orthodontic brackets described herein may be used in a manner that can add to the comfort of patient, decrease clinician chair side time, and decrease the expenses of the clinic. Use of the exemplary embodiments described herein may allow for rapid progression of treatment into advance stages of treatment. Thus, progression into advanced stages of treatment may be more rapid than conventional orthodontic treatments; because it is not necessary to repeatedly replace the archwire and/or to repeatedly bend the archwires to impart desired forces and/or moment or desired changes to force and/or moment applied to the teeth. Once an orthodontist is satisfied with a final positioning of a tooth, rigid wires may be applied to form a fixed structure to lock the braces in the desired position.

The present invention may be further understood with reference to the following description and the appended drawings, wherein like elements are referred to with the same reference numerals. The present invention relates to an orthodontic bracket for a tooth that provides for adjustability of the positioning and orientation of the bracket after attachment of the bracket to the tooth. In particular, the orthodontic bracket may be independently adjustable, after attachment to the tooth, in three dimensions and/or orientations, e.g., the bracket may be slidable along and/or rotatable around one or more axis, may be adjustable up or down along an apico-coronal direction of the tooth.

As shown in FIGS. 1-6, an orthodontic bracket device 100 according to an exemplary embodiment of the present invention, comprises a base portion 102 configured to be attached to a surface of a tooth and an adjustable portion 101 movably and/or removably attachable to the base portion 102. The adjustable portion 101 may include a channel 106 for receiving a wire therethrough. In one embodiment, the adjustable portion 101 may comprise a body portion 104 and a housing portion 105 removably attachable to the body portion 104. The housing portion 105 may include the channel 106 for receiving a wire therethrough.

The base portion 102, as shown in FIGS. 7, 9 and 10 may include a substantially planar component 103 (alternatively, this component 103 may be substantially flat and may be shaped to substantially conform to the contours of a tooth) having a first surface 116 which, in an operative configuration, is attached to a surface of a tooth, and a second surface 118 opposing the first surface 116. The first surface 116 may be attached to the surface of the tooth by any suitable means, such as, for example, adhesive bonding, more particularly, a dental bonding resin. The substantially planar component 103 may also include a first side 122 and a second side 126 opposite the first side. In some embodiments, the substantially planar component 103 may also include rounded corners so as to reduce likelihood of injury or discomfort to the patient. The second surface 118 may include a first rail 120 on the first side 122 along the second surface 118 and a second rail 124 on the second side 126 extending along the second surface 118. The first and second rails 120 and 124 may extend substantially parallel to one another. A space 128 defined between the first and second rails 120, 124 and the second surface 118 is sized and shaped to slidably receive a correspondingly sized and shaped portion of the adjustable portion 101 therein. In one embodiment, the space 128 is sized and shaped to slidably receive a correspondingly sized and shape portion of the body portion 104 therein. In particular, the base portion 102 may be analogous to a drawer for the correspondingly sized and shaped portion of the body portion 104 to be slidably received in the space 128 defined between the first and second rails 120, 124. A lateral surface 130 along the first side 122 of the base portion 102 includes one or more openings 132 extending therein. In one particular embodiment, the lateral surface 130 may include an opening 132 that extends laterally therethrough such that the opening 132 is in communication with a portion of the space 128 adjacent the first side 122.

The base portion 102 may further include any suitable locking mechanism for reversibly engaging the base portion 102 with the adjustable portion 101. In particular, the adjustable portion 101 may be slidably adjustable, via the locking mechanism, along a length of the first side 122 and/or second side 126 of the base portion 102. In some embodiments, the adjustable portion 101 may be slidably adjustable by predetermined increments along the length of the first side 122 and/or the second side 126 of the base portion 102. More particularly, the predetermined increments may be different from each other or may be uniformly distanced.

In one exemplary embodiment, the base portion 102 may further include a locking lever 134 extending from a first end 136 to a second end 138. The locking level 134 may be pivotally coupled to a portion of the substantially planar component 103 along the first side 122. The locking lever 134 may be movable between an open position (shown in FIG. 8), in which locking lever 134 is pivoted away from the lateral surface 130, and a closed position (shown in FIG. 7), in which the locking lever 134 is moved toward the lateral surface 130. The locking lever 134 may be pivoted to an open position that forms any suitable angle with the lateral surface 130. In some embodiments, the locking lever 134 may be freely pivotable. In other embodiments, the locking lever 134 may be limited to a range of motion that is within a predetermined angle from the lateral surface 130. For example, the locking lever 134 may be pivotable up to 180° away from the lateral surface 130. Alternatively, the locking lever 134 may be pivotable up to 150°, 135°, 120°, 90°, 60°, 45° or 30° degrees away from the lateral surface 130. The locking lever 134 may also include a locking tab 140 that is configured to engage opening 132. In some embodiments, the locking tab 140 may extend laterally from the locking lever 134. In one example, the locking tab 140 may extend substantially perpendicularly, or perpendicularly, to an axis along the first end 136 and the second end 138 of the locking lever 134. The locking tab 140 and opening 132 of the lateral surface 130 may be of any suitable shape such that the locking tab 140 may be inserted into and engage opening 132 of the lateral surface. In certain embodiments, the locking lever 134 may include a locking tab 140 configured to engage opening 132 such that when the locking lever 134 is moved to the closed position, the locking tab 140 is passed through opening 132 into the space 128 to lock the adjustable portion 101 relative thereto, as will be described in further detail below.

The adjustable portion 101 may comprise any suitable orthodontic bracket having a channel 106 for receiving a wire therethrough. The adjustable portion 101 may include any suitable self-ligating orthodontic bracket. In particular, the adjustable portion 101 may include a body portion 104, and a housing portion 105 movably coupled to the body portion 104, where the housing portion 105 may include a self-ligating orthodontic bracket, including a movable portion that can be manipulated to an open configuration permitting an archwire to be inserted lengthwise into channel 106, and a close configuration where the movable portion is closed to surround the length of the archwire. Any suitable self-ligating orthodontic bracket may be incorporated into the adjustable portion 101, such as, for example, speed brackets commercially available from Strite Industries, Damon System, Clarity SL, Carriere LX by Ortho Organizers, and In-Ovation R, In-Ovation C, and In-Ovation L by Dentsply GAC.

In particular, the adjustable portion 101 may include a body portion 104, and a housing portion 105 movably coupled to the body portion 104. In one exemplary embodiment, the self-ligating bracket may include the channel 6 for receiving wire therethrough. The self-ligating bracket may include a self-ligating cap corresponding to the housing portion 105, and a movable socket corresponding to the body portion 104. In one particular embodiment, the self-ligating cap may be attached to the movable socket via two clips that rotatably interlock with two pins located on the movable socket. The self-ligating bracket may be movable between an open configuration permitting an archwire to be inserted lengthwise into channel 106, and a close configuration where the movable portion is closed to surround the length of the archwire. Furthermore, the bracket may be locked in either the open configuration or the close configuration by any suitable means. For example, the cap may be locked in the open configuration or the closed configuration via two dimples on the self-ligating cap and two concavities positioned on the surface of the movable socket. The two concavities may have any suitable shape and may, for example, be round processes on the side of the movable socket to which the self-ligating cap is installed.

Figure 11:
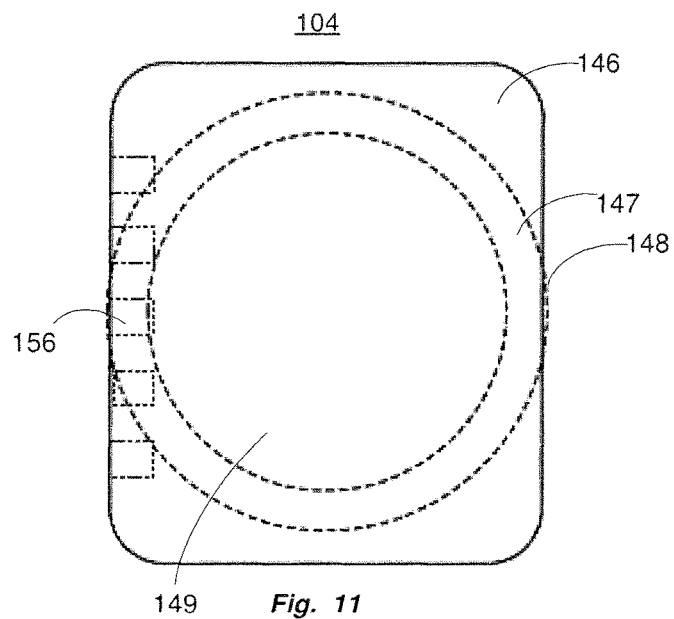
FIG. 11 shows a front view of a body portion of the exemplary orthodontic bracket device of FIG. 1.
Figure 12:
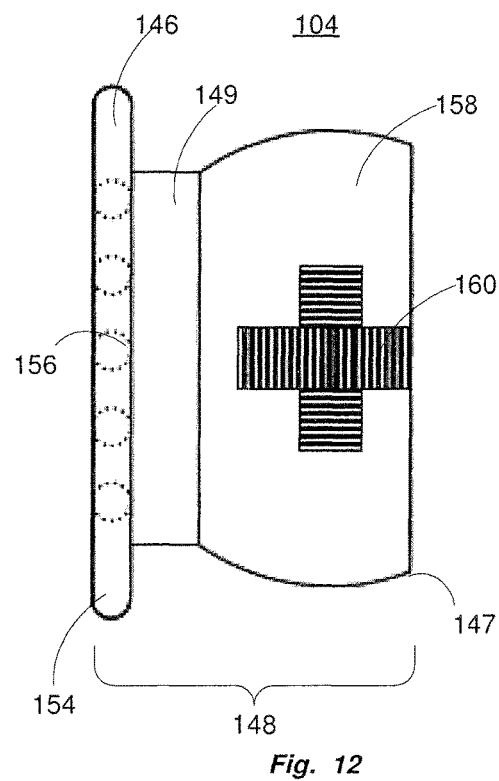
FIG. 12 shows a side view of the body portion of the exemplary orthodontic bracket device of FIG. 1.
Figure 13:
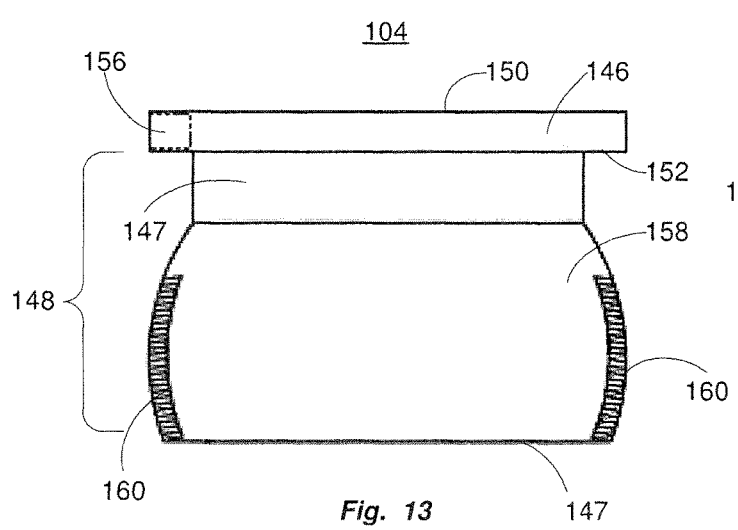
FIG. 13 shows a top view of the body portion of the exemplary orthodontic bracket device of FIG. 1.
Figure 14:
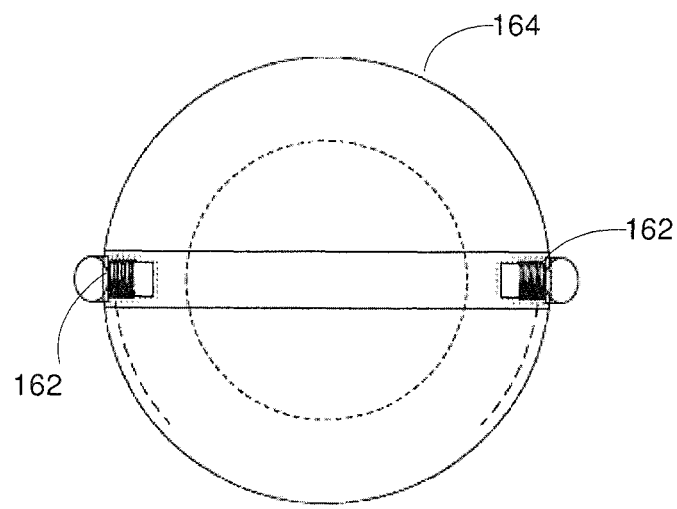
FIG. 14 shows a front view of a housing portion of the exemplary orthodontic bracket device of FIG. 1.
Figure 15:
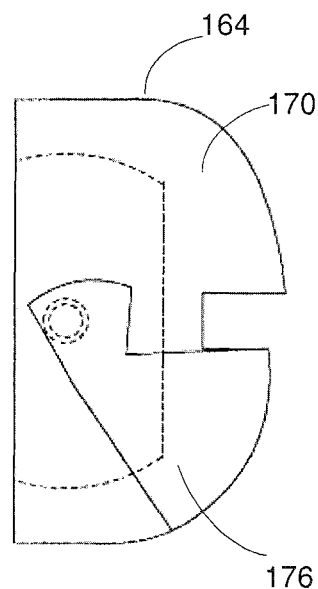
FIG. 15 shows a side view of the housing portion of the exemplary orthodontic bracket device of FIG. 1.
Figure 16:
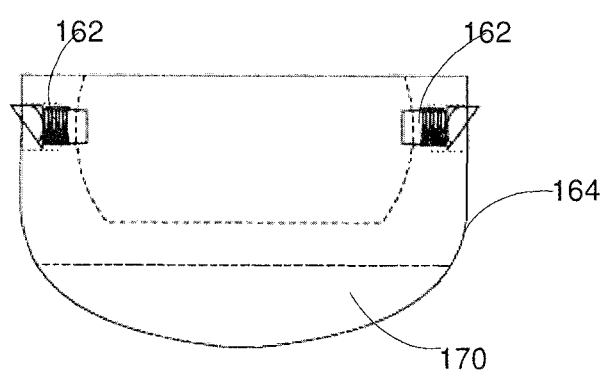
FIG. 16 shows a top view of the housing portion of the exemplary orthodontic bracket device of FIG. 1.
Figure 17:
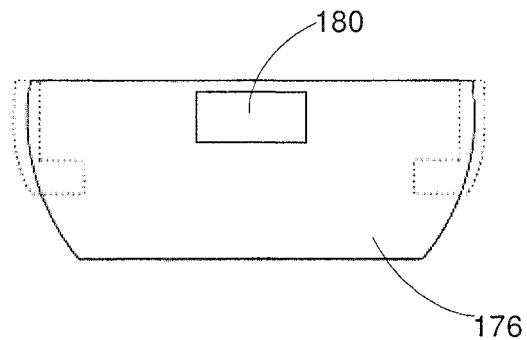
FIG. 17 shows a front view of a bracket gate of the housing portion of FIG. 14.
Figure 18:
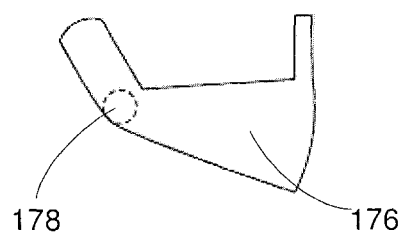
FIG. 18 shows a side view of the bracket gate of the housing portion of FIG. 14.
Figure 19:
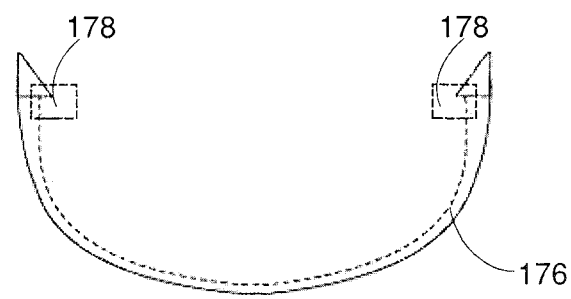
FIG. 19 shows a top view of the bracket gate of the housing portion of FIG. 14.

In another exemplary embodiment, the body portion 104, as shown in FIGS. 11-13, includes a sliding plate 146 and an interior portion 148 extending therefrom. The sliding plate 146 may be sized and shaped to be slid into the space 128 defined by the first and second rails 120, 124 of the base portion 102. The sliding plate 146 may be substantially planar, and may include a first surface 150, which, in an operative configuration, faces toward the second surface 118 of the base portion 102, and a second surface 152 substantially opposing the first surface 150. A lateral surface 154 of the sliding plate 146, which may be aligned with the lateral surface 130 of the base portion 102 when the base portion 102 and the sliding component 142 are coupled, includes a plurality of recesses 156 extending thereinto. The plurality of recesses 156 may be positioned along a length of the lateral surface 154 so that each of the recesses 156 represents a different position in which the sliding component 142 may be locked relative to the base portion 102. For example, the lateral surface 154 may include at least 3 recesses 156 representing different positions in which the sliding component 142 may be locked relative to the base portion 102. In other examples, the lateral surface 154 may include at least 5, at least 7, at least 9, at least 11 or at least 13 recesses 156 along the length of the lateral surface 154. The recesses 156 may be spaced apart by at least 0.1 mm, at least 0.15 mm, or at least 0.2 mm. The recesses 156 may also be spaced apart by at most 40 mm, at most 20 mm, or at most 10 mm. In some embodiments, the recesses 156 may be spaced apart by a distance from about 0.1 mm to about 40 mm, from about 0.15 to about 10 mm, or from 0.2 mm to about 10 mm. In some embodiments, the plurality of recesses 156 may be spaced uniformly apart from each other. In other embodiments, the plurality of recesses 156 may be spaced apart by different distances. The sliding plate 146 may be slid into the space 128 along the first and second rails 120, 124 of the base portion 102, with the locking lever 134 in the open position. Once the sliding component 142 is in a desired position relative to the base portion 102, the locking lever 134 may be moved to the closed position so that the locking tab 140 is inserted through the opening 132 and into the selected one of the recesses 156 to lock the sliding component 142 in desired position relative to the base portion 102.

The interior portion 148 may be sized and shaped such that the housing portion 105 is movable, and in certain embodiments, rotatably movable, with respect to the interior portion 148. The interior portion 148 may extend from the second surface 152 of the sliding plate 146. The interior portion 148 may comprise a head portion 147 sized and shaped to be rotatably movable, with respect to the housing portion 105. The head portion 147 may have any suitable shape, for example, the head portion 147 may be substantially a hemisphere, a truncated hemisphere, obloid, a truncated obloid shape, etc. In certain embodiments, the head portion 147 and the housing portion 105 may together form a ball-and-socket joint such that the head portion 147 is rotatably movable within an interior of the housing portion 105.

The interior portion 148 may optionally include a connecting portion 149 extending from the sliding plate 146 to the head portion 147. The connecting portion 149 is sized and shaped to provide a sufficient distance between the head portion 147 and the sliding plate 146 such that the housing portion 105, when coupled to the interior portion 148, is movable about head portion 147. However, the connecting portion 149 may be sized and shape to not exceed certain thresholds so as to avoid patient discomfort. For example, the connecting portion 149 may have a height of at least about 1 mm. However, the connecting portion 149 may have a height not exceeding about 5 mm. The connecting portion 149 may have any suitable shape, such as, for example, a cylindrical shape. Furthermore, in some embodiments, the connecting portion 149 may have an adjustable height, wherein the connecting portion 149 may be reversibly extended or retracted in a buccopalatal direction, when the device 100 is in use, as manually manipulated by the user. In some embodiments, the connecting portion 149 may be slidably adjustable by predetermined increments of height. More particularly, the predetermined increments may be different from each other or may be uniformly distanced.

Alternatively, the interior portion 148 may comprise a head portion 147 directly coupled to the sliding plate 146. The head portion 147 may be sized and shaped to be movably coupled to the housing portion 105, such that the head portion 147 is rotatably movable within an interior of the housing portion 105. In one exemplary embodiment, the housing portion 105 may include at least one or more slits (not shown) configured to expand and allow for rotation of the housing portion 105 about the head portion 147. The slit is preferably biased to a closed configuration and only temporarily opens upon application of a force by a user.

The housing portion 105, as shown in the exemplary embodiment of FIGS. 5-6 and 14-16, may include any suitable exterior housing comprising a cup element 164 having an interior cavity 166 sized and shaped to receive the body portion 104, in particular, a head portion 147 of an interior portion 148 of the body portion 104. Moreover, the body portion 104 may be rotatably coupled to the housing portion 105 such that the cup element 164 is mounted over the body portion 104. The cup element 164 may be coupled to the body portion 104 via any suitable mechanism and may include a separate element for fixing and/or locking the cup element 164 in a position and/or orientation relative to the body portion, 104. In other embodiments, the cup element 164 may be coupled to the body portion 104 via any suitable locking mechanism.

For example, the cup element 164 may be coupled to the body portion 104 via at least one locking pin 162, e.g., a pair of locking pins 162 which are inserted through holes 168 on opposing sides of the cup element 162. In some embodiments, the locking pins 162 may be configured to apply a force to an exterior surface 158 of the body portion 104. For example, the locking pins 162 may be biased to push radially inward against the exterior surface 158 of the body portion 104. In particular, the locking pins 162 may include a spring or other biasing element to exert a force against the exterior surface 158 of the body portion 104. For example, the locking pins 162 may be biased to exert at least a force of about 100 cN, about 120 cN, about 150 cN or about 200 cN against the exterior surface 158 of the body portion 104.

The locking pins 162 may be sized and shaped to engage the exterior surface 158 of the body portion 104 to mount the housing portion 105 to the body portion 104. In some embodiments, the locking pins 162 are mounted via friction to the exterior surface 158. In particular, the exterior surface 158 may include at least one etched surfaces 160, e.g., a pair of etched surfaces 160 to frictionally engage the locking pins 162. The locking pins 162 may engage the etched surfaces 160 so that the housing portion 105 may be moved and locked in a desired position relative to the body portion 104. The etched surfaces 160 may provide an area having an increased coefficient of friction, for example, the etched surfaces 160 may provide an area having a coefficient of friction of about 0.2 to about 1, which may also be dependent on the type of material used. The etched surfaces 160 may be etched with any suitable patterning that increases the friction of the surface, for example, the etched surfaces may include a pattern of parallel lines. In one embodiment, the etched surfaces 160 may be in a substantially crossed-shape on the exterior surface 158 of the body portion 104. The substantially crossed shaped etched-surface 160 may be sized and shaped so that the housing portion 105 is capable of being moved relative to the body portion 104 in a variety of directions and orientation. Although the etched surfaces 160 are shown and described as substantially cross-shaped, it will be understood by those of skill in the art that the etched surfaces 160 may have any of a variety of shapes so long as the housing portion 105 is movable relative to the body portion 104 in various directions and orientations.

In an alternative embodiment, the locking pins 162 may be mechanically engaged to at least one groove (not shown), e.g., a pair of grooves to receive the locking pins 162 therein. For example, the body portion 104 may include a pair of grooves along an exterior surface 158 of the body portion 104. The grooves may extend into and be position on opposite sides of the body portion 104. The grooves may mechanically engage the locking pins 162 so that the housing portion 105 may be moved and locked in a desired position relative to the body portion 104. For example, the locking pins 162 may be received within the grooves, which may be along the exterior surface 158 of the body portion 104. As described above, the housing portion 105 may be movable over the body portion 104 in a variety of configurations so that the housing portion 105 is in a desired configuration with respect to the body portion 104. Once the desired orientation is achieved, the housing portion 105 may be fixed relative to the sliding component 142 by moving the locking pins 162 radially inward to engage a portion of the groove. The locking pins 162 may be biased toward a locked position via biasing elements such as, for example, springs. Although the grooves are shown and described as substantially cross-shaped, it will be understood by those of skill in the art that the grooves may have any of a variety of shapes so long as the housing portion 105 is movable relative to the body portion 104 in various directions and orientations.

In another embodiment, the cup element 164 may be fixed or locked in a desired position and/or orientation relative to the body portion 104 via any suitable locking mechanism, which may include means for frictionally engaging an exterior surface 158 of the body portion 104. For example, the exterior surface 158 may further include an opening, e.g., two small shallow holes, where a locking mechanism for the housing portion 105, in particular the self-ligating cap, relative to the body portion 104 may be exposed. The opening, e.g., two small shall holes, may be configured to receive any suitable instrument for disengaging the locking mechanism and manipulating the cup element 164 therein. The locking mechanism may be any suitable mechanism for reversibly fixing, securing and/or locking the cup element 164 in a desired position and/or orientation relative to the body portion 104. For example, the locking mechanism may include a locking spring having one or more spheres that are configured to engage the instrument for manipulating the cup element 164 such that cup element 164 may be freely movable relative to the body portion 104 when the instrument is engaged to the locking mechanism, and the cup element 164 is fixed relative to the body portion 104 when the instrument is disengaged from the locking mechanism. The locking spring may be formed from an elastic or flexible material, such as for example Nitinol or a flexible stainless steel. The locking spring may be biased to exert a force against the exterior surface 158 of the body portion 104 such that the locking spring frictionally engages the exterior surface 158 and locks the positioning and/or orientation of the cup element 164 relative to the body portion 104. For example, the locking spring may be biased to exert at least a force of about 100 cN, about 120 cN, about 150 cN or about 200 cN against the exterior surface 158 of the body portion 104. The two spheres may be each attached to an end of the locking spring such that when the instrument engages the spheres, the locking spring is pushed away from the exterior surface 158 of the body portion 104 such that the cup element 164 is freely movable relative to the body portion 104.

Additionally, the channel 106 may extend through an exterior 170 of the cup element 164 so that, when the cup element 162 is mounted and fixed over the body portion 104, an archwire may be inserted into the channel 106. When the base portion 102 and the body portion 104 are fixed to a tooth, the channel 106 may extend substantially horizontally, e.g., in a mesial-distal direction of the tooth.

Figure 3:
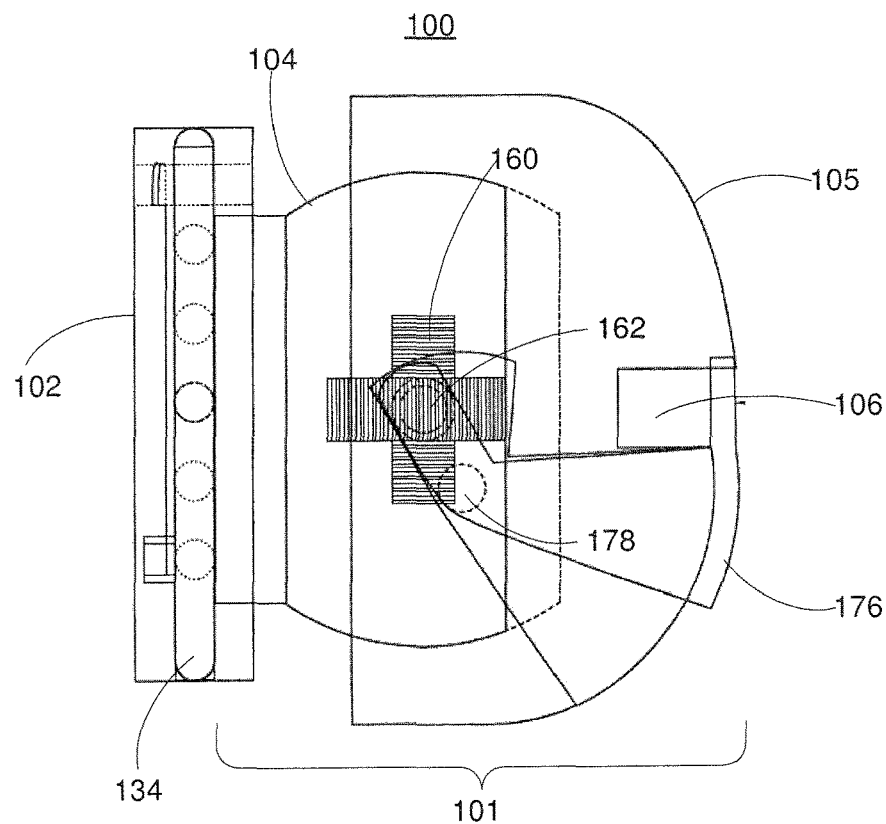
FIG. 3 a side view of the exemplary orthodontic bracket device of FIG. 1 having a bracket gate in a closed position.
Figure 4:
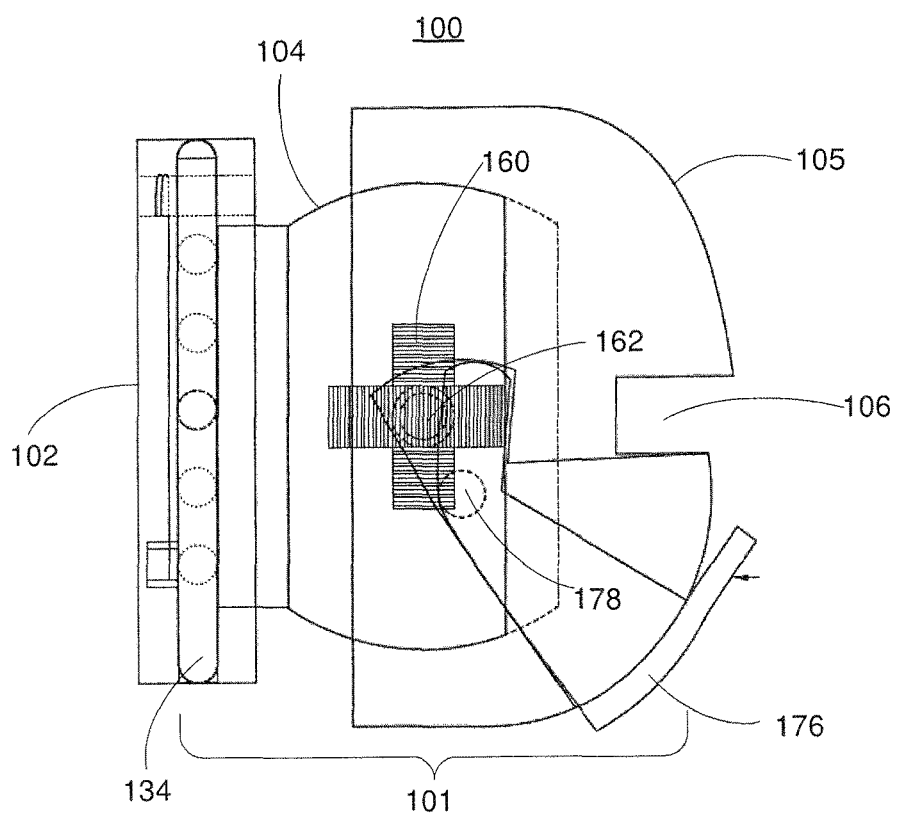
FIG. 4 a side view of the exemplary orthodontic bracket device of FIG. 1 where the bracket gate is in an open position.
Figure 5:
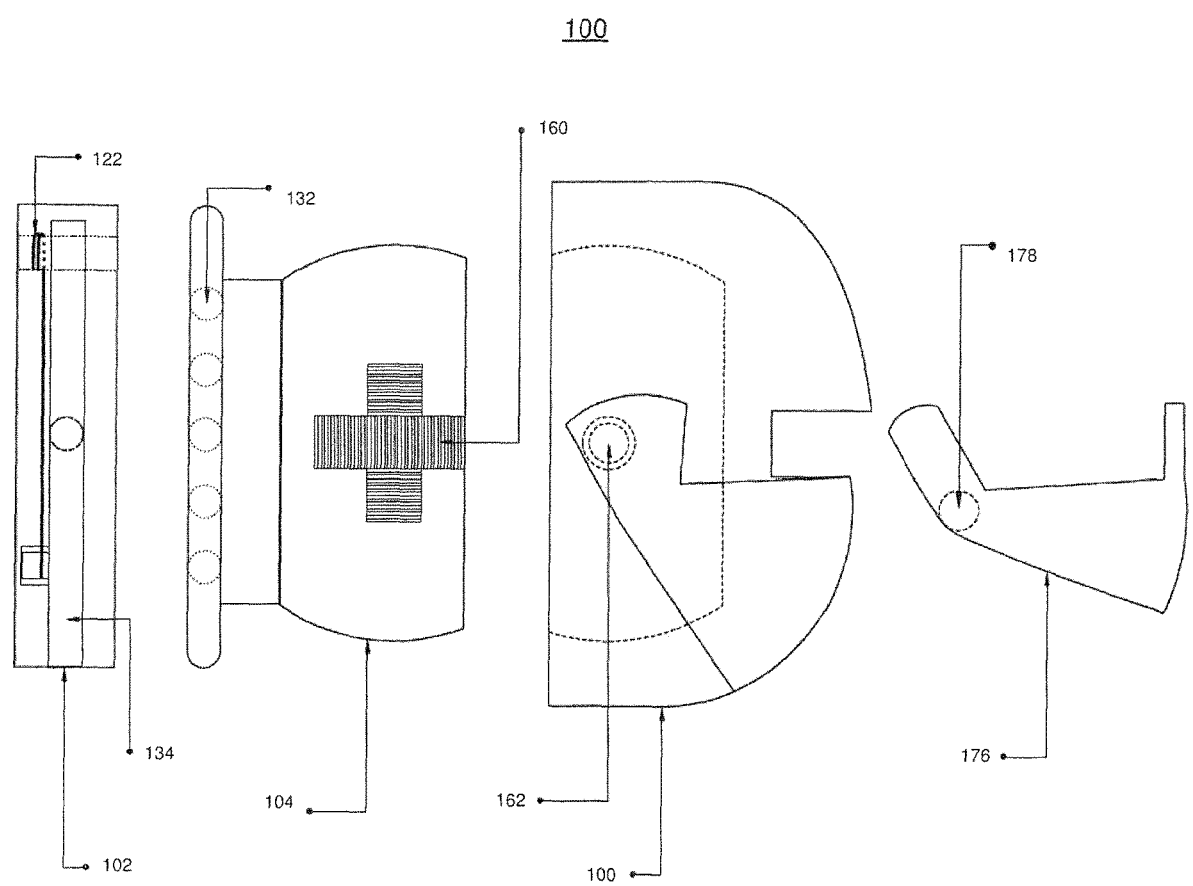
FIG. 5 an exploded side view of the exemplary orthodontic bracket device of FIG. 1.
Figure 6:
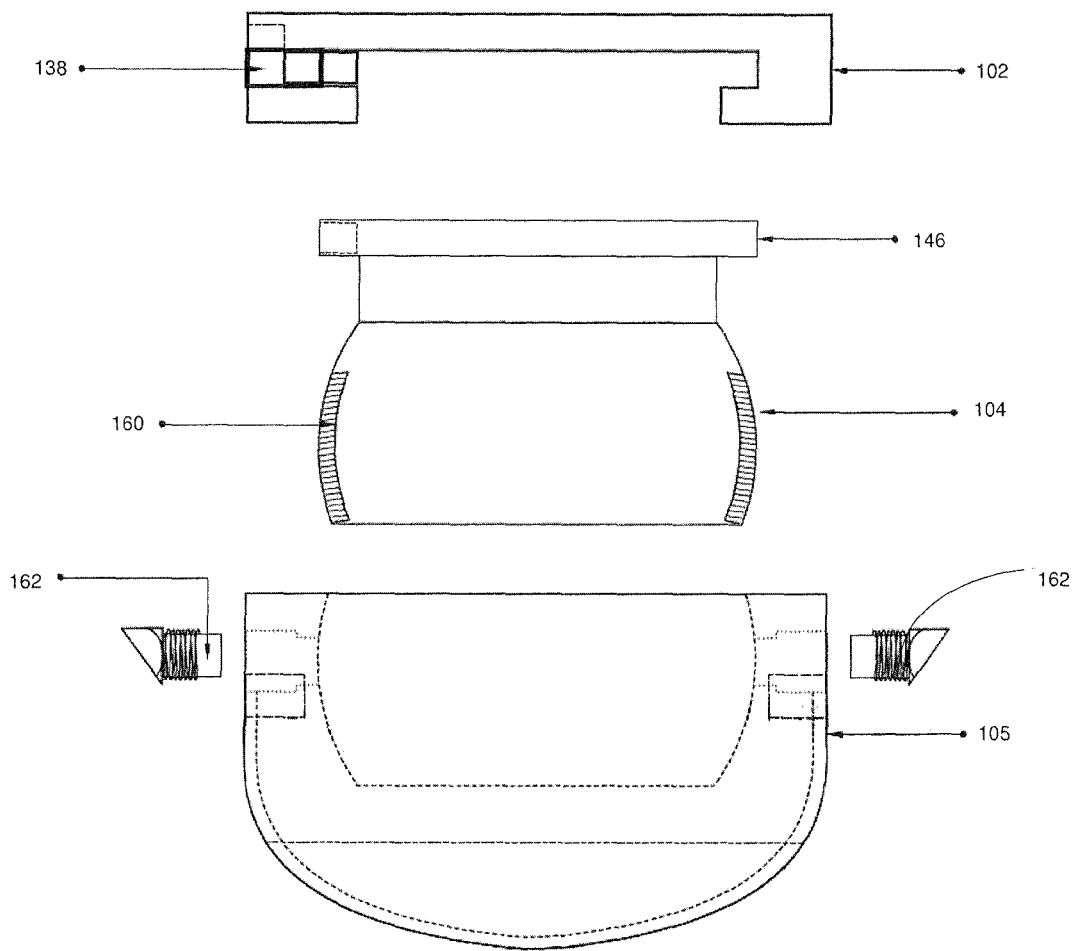
FIG. 6 an exploded top view of the exemplary orthodontic bracket device of FIG. 1

In one particular embodiment, the housing portion 105 may further include a bracket gate 176, as shown in FIGS. 5-6, 15, and 17-19, pivotally coupled to the cup element 164 so that the bracket gate 176 is movable between an open position, in which the bracket gate 176 does not extend over the channel 106 so that the archwire may be received therein, and a closed position, in which a portion of the bracket gate 176 extends over the channel 106 so that the archwire is trapped within the channel 106. The bracket gate 176 is sized and shaped to extend about the exterior 170 of the cup element 164. In one embodiment, the bracket gate 176 may have a substantially curved shape corresponding to a substantially curved exterior of the cup element 164. The bracket gate 176 may be pivotally coupled to the cup element 164 on opposing sides thereof so that portions of the bracket gate 176 interface with the locking pins 162. In particular, the bracket gate 176 includes a pair of locking arms 178 extending laterally inward from opposing sides thereof. When the bracket gate 176 is in the closed position, as shown in FIG. 3, the locking arms 178 engage the locking pins 162, pushing the locking pins 162 radially inward to fix the cup element 164 in the desired position relative to the interior portion 148. When the bracket gate 176 is moved toward the open position, as shown in FIG. 4, however, the locking arms 178 are moved out of engagement with the locking pins 162 so that the cup element 162 is movable over the body portion 104. In a further embodiment, the bracket gate 176 may also include a window 180 extending thereinto so that, when the bracket gate 176 is in the closed position, an orthodontist or other user may access the channel 106 or portions of the housing portion 105 by inserting any suitable instrument for manipulating the archwire through the window 180. In some exemplary embodiments, the window 180 of the bracket gate 176 may engage any suitable instrument for manipulating either the archwire or the angulation/torque/tip or off set of the bracket.

In an alternative embodiment, as shown in FIGS. 24-29, an orthodontic bracket device 100' according to another exemplary embodiment of the present invention is provided. The orthodontic bracket device 100' comprises a base portion 102' configured to be attached to a surface of a tooth and an adjustable portion 101' movably and/or removably attachable to the base portion 102'. The orthodontic bracket device 100' is substantially similar to the device 100 described above, except as further described below.

As shown in FIGS. 24-26, the base portion 102' may include a substantially planar component 103' having a first surface 116' which in an operative configuration, may be attached by any suitable means, as discussed above, to a surface of a tooth, and a second surface 118' opposing the first surface 116'. Similar to the base portion 102 discussed above, the second surface 118' may also include a first rail 120' on the first side 122' along the second surface 118' and a second rail 124' on the second side 126' extending along the second surface 118'. A space 128' defined between the first and second rails 120', 124' on the second surface 118' is sized and shaped to slidably receive a correspondingly sized and shaped portion of an alternative embodiment of an adjustable portion 101' therein.

Similar to base portion 102 discussed above, the base portion 102' may further include any suitable locking mechanism for reversibly engaging the base portion 102' with the adjustable portion 101'. In this exemplary embodiment, the base portion 102' may include a substantially planar component 103' having a first lateral surface 130' on the first side 122' of the base portion 102' and a second lateral surface 131' on the second side 126' of the base portion 102'. The first lateral surface 130' may include a plurality of openings 132' that extends laterally therethrough such that the openings 132' are in communication with a portion of the space 128'. The second lateral surface 131' may include similar openings 132'. The base portion 102' may further include a locking portion 134' that is configured to be movable between an open configuration (e.g., shown in FIG. 26) and a closed configuration (e.g., shown in FIG. 25). In particular, the locking portion 134' may be configured to slidingly engage (as shown in FIG. 25) and disengage (as shown in FIG. 26) the adjustable portion 101'. Specifically, the substantially planar component 103' may further comprise a plurality of elongated openings 135' each configured to receive a tab 137' from the locking portion 134' therein. The tabs 137' may be laterally slidable between the open configuration and the closed configuration. The elongated openings 135' may have any suitable shape, such as, but not limited to an ovoid shape for engaging the tabs 137' therein. As shown in the exemplary embodiment of FIGS. 24-26, the substantially planar component 103' may include three ovoid openings 135' that allow the locking portion 134' to slide laterally back and forth to reversibly lock and unlock the adjustable portion 101' with respect to the base portion 102'.

The locking portion 134' may extend from a first end 136' to a second end 138', and may include a plurality of laterally extending protrusions 140', which may be arranged along a length from the first end 136' to the second end 138'. In some embodiments, the protrusions 140' may extend substantially perpendicularly, or perpendicularly to an axis along the first end 136' and/or the second end 138' of the locking portion 134'. The protrusions 140' may be sized and shaped to engage the openings 132'. In some embodiments, the protrusions 140' may be uniformly sized and shaped such that each protrusion 140' is configured to engage any one of the plurality of uniformly sized and shape openings 132'. The protrusions 140' may have any suitable shape that is configured to be inserted into and engage openings 132'. For example, the protrusions 140' may be substantially rectangularly shaped to engage correspondly shaped openings 132' in the first lateral surface 130' and/or the second lateral surface 131'. The locking portion 134' may be located to the first side 122' and/or the second side 126' of the substantially planar component 103'. The positioning of the locking portion 134' with respect to the base portion 102' provides a means for locking and unlocking the positioning of the adjustable portion 101' that is easy to use for the user, e.g., orthodontist, clinician, and/or dental assistant. The locking portion 134' may be movable laterally to lock or unlock the adjustable portion 101' relative to the base portion 102'. As can be seen in FIGS. 24-26, the locking portion 134' may include three cylindrical tabs 137' that are configured to slide along each of the three three ovoid openings 135' shown in the exemplary embodiment. In this particular embodiment, the locking portion 134' includes five protrusions 140' extending laterally towards the openings 132'. The protrusions 140' functions as a male process for the locking mechanism by which lateral sliding motion may insert the protrusions 140' into its counterpart female process for the locking mechanism, which are the openings 132' in the first lateral surface 130' and/or the second lateral surface 131'. In one particular embodiment, the locking portion 134' may include protrusions 140' configured to engage openings 132' such that when the locking portion 134' is moved to the closed position, each of the protrusions 140' on the locking portion 134' is passed through an opening 132' into the space 128' to lock the adjustable portion 101' relative therereto, as will be described in further detail below.

Figure 27:
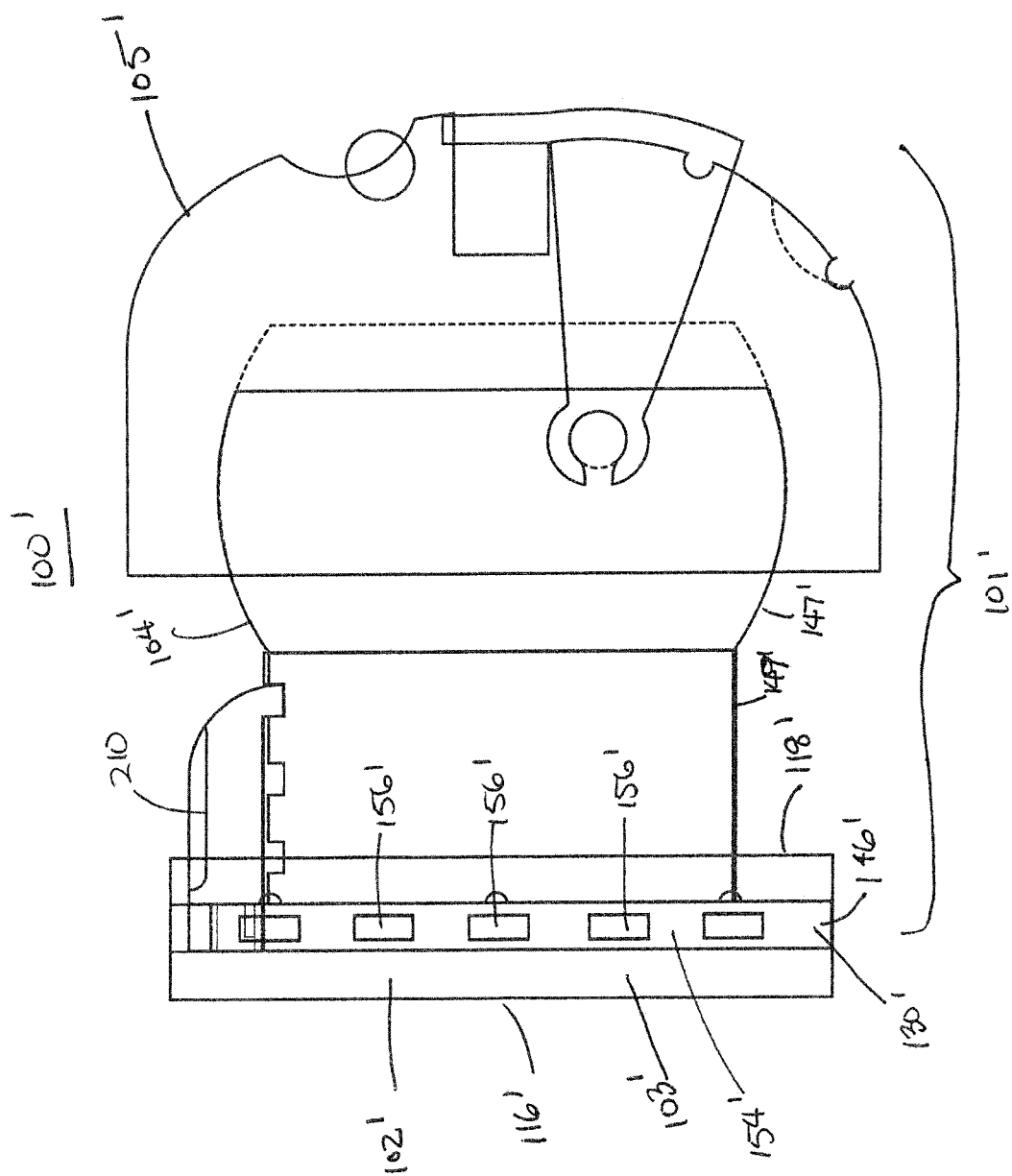
FIG. 27 shows a side view of an orthodontic bracket device according to the alternative exemplary embodiment of FIG. 24.

As shown in FIG. 27, the adjustable portion 101' may include a body portion 104', and a housing portion 105' movably coupled to the body portion 104'. The housing portion 105' may be similar to the housing portion 105 as discussed above. The body portion 104' may comprise a sliding plate 146' and an interior portion 148' extending therefrom. The sliding plate 146' may be sized and shaped to be slid into the space 128' defined between the first and second rails 120', 124'. The sliding plate 146' may be substantially planar, and may include a first surface 150' which, in an operative configuration, faces towards the second surface 118' of the base portion 102' and a second surface 152' substantially opposing the first surface 150'. A first lateral surface 154' of the sliding plate 146', which may be aligned with the first lateral surface 130' of the base portion 102' when the base portion 102' and the sliding component 142' are coupled, includes a plurality of recesses 156' extending thereinto. Similarly, a second lateral surface (not shown) of the sliding plate 146', which may be aligned with the second lateal surface 131' of the base portion 102' when the base portion 102' and the sliding component 142' are coupled, also includes a plurality of recesses 156' extending thereinto. The plurality of recesses 156' may be positioned along a length of the first lateral surface 154' so that each of the recesses 156' represents a different position in which the sliding component 142' may be locked relative to the base portion 102'. For example, as shown in FIG. 27, the first lateral surface 154' and/or the second lateral surface may each include at least 5 recesses 156' configured to engage the protrusions 140' on the locking portion 134' when the locking portion 134' is in a closed configuration (e.g., as shown in FIG. 25). The recesses 156' may be sized and shaped to engage the protrusions 140' on the locking portion 134' such that the sliding component 142' may be locked into different positions relative to the base portion 102'. In some embodiments, the recesses 156' may be uniformly sized and shaped such that each recess 156' is configured to engage any one of the plurality of protrusions 140'. The recesses 156' may have any suitable shape that is configured to received a protrusion 140' therein. For example, the recesses 156' may be substantially rectangularly shaped to receive correspondingly shaped protrusions 140' therein. The recesses 156' may be part of a locking mechanism. In particular, the recesses 156' may function as counterpart female processes for the locking mechanism that engages and the protrusions 140' from the locking portion 134', which function as male processes that engage and interlock with the recesses 156'.

In a further exemplary embodiment, the first rail 120' and the second rail 124' may be configured to provide a mechanism for a user to detect the positioning of each opening 132' on either the first lateral surface 130' or the second lateral surface 131.' In particular, each opening 132' may be accompanied by a small bump or dimple in the first rail 120' or the second rail 124' in particular, on the first lateral surface 130' or the second lateral surface 131', respectively. The small bump or dimple may serve as a mechanism for providing a clicking noise that provides the user an additional means for locating the openings 132' and confirming that the protrusions 140' from the locking portion 134' are securely interlocked with the openings 132' and/or the recesses 156' on the sliding plate 146' such that the adjustable portion 101' is positionally locked relative to the base portion 102'.

Figure 29:
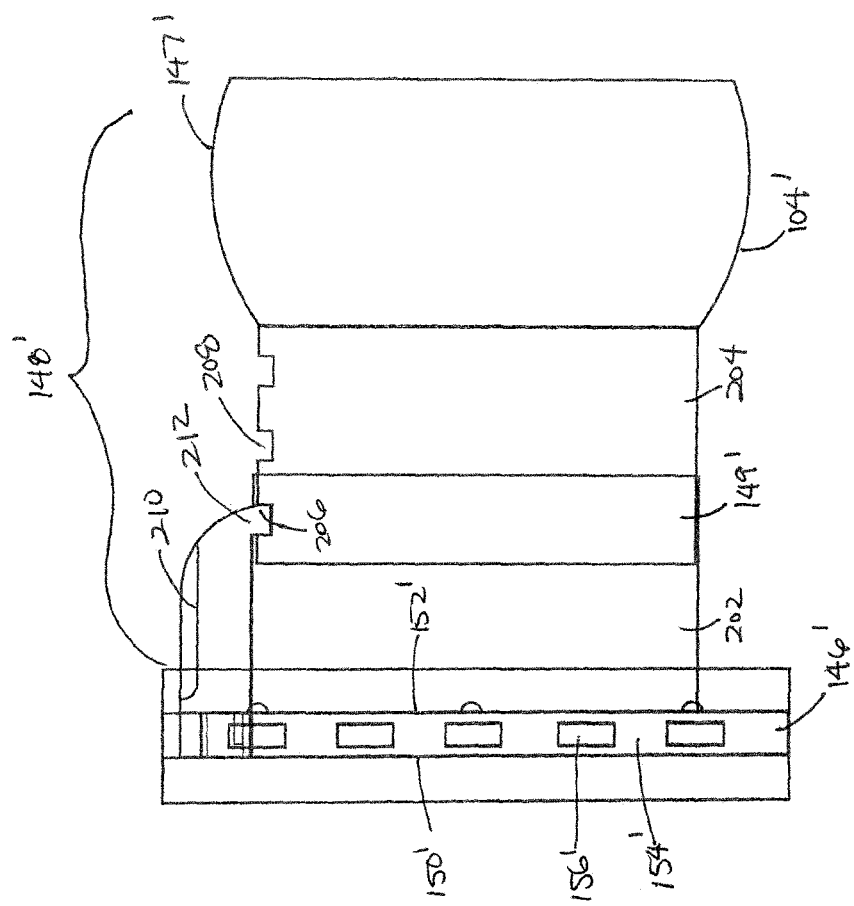
FIG. 29 shows a side view of the body portion of the alternative exemplary orthodontic bracket device of FIG. 27 in an extended configuration.
Figure 28:
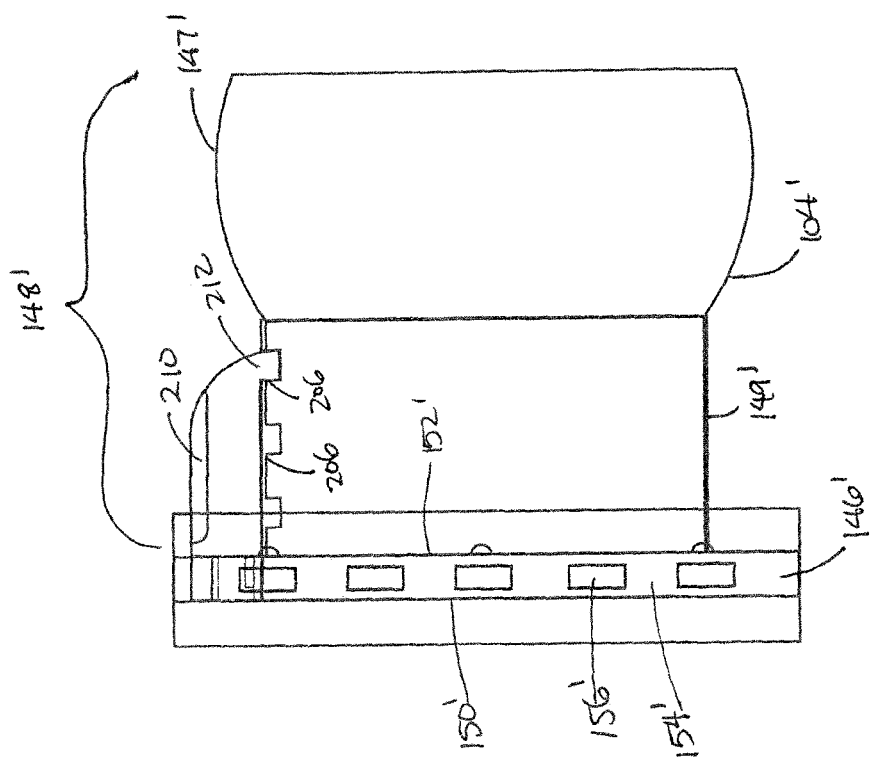
FIG. 28 shows a side view of the body portion of the alternative exemplary orthodontic bracket device of FIG. 27 in a retracted configuration.

In addition, the interior portion 148' of the body portion 104' may be reversibly extendable (e.g., as shown in FIG. 29) and retractable (e.g., as shown in FIG. 28). In particular, the interior portion 148' may be reversibly extendable and retractable in a buccopalatal direction when the orthodontic bracket device 100' is in use. In one exemplary embodiment, the interior portion 148' may include an extendable portion that reversibly extends and retracts in the buccopalatal direction when the device 100' is in use. In particular, the extendable portion may include a telescoping mechanism that reversibly extends and retracts. In addition, the extendable portion may be coupled to another locking mechanism that reversibly engages and disengages with the extendable portion such that the housing portion 105' is positionally adjustable and locked into place relative to the interior portion 148', particularly the sliding plate 146'.

For example, in the exemplary embodiment shown in FIGS. 27-29, the interior portion 148' comprises a head portion 147' sized and shaped to be rotatably movable with respect to the housing portion 105', similar to the head portion 147' discussed above, and a connecting portion 149' extending from the sliding plate 146' to the head portion 147'. The connecting portion 149' may be reversibly extendable and retractable in a buccopalatal direction when the orthodontic bracket device 100' is in use. The connecting portion 149' may have any suitable shape, such as, for example, a cylindrical shape. The body portion 104' may further comprise a locking portion 210 for reversibly engaging and disengaging the extendable connecting portion 149' such that the housing portion 105' is adjustable and locked into a desired position relative to the interior portion 148, particularly the sliding plate 146.

As shown in FIGS. 27-29, the connecting portion 149' may comprise an outer elongated tube 202 and an inner elongated component 204 nested within the outer elongated tube 202 such that the inner elongated component 204 may be slidably movable longitudinally in a buccopalatal direction. The outer elongated tube 202 and the inner elongated component 204 may have any suitable shape. In particular, the outer elongated tube 202 and the inner elongated component 204 have corresponding cylindrical shapes. The outer elongated tube 202 may have a plurality of openings 206 that extend from an exterior surface to an interior surface of the outer elongated tube 202, such that the openings 206 are in communication with an interior volume in which the inner elongated component 204 occupies. The inner elongated component 204 may comprise a plurality of recesses 208 such that the openings 206 may be aligned with the recesses 208 and both the outer elongated tube 202 and the inner elongated component 204 may be engaged by a locking portion 210 to positionally adjust and lock into place the inner elongated component 204 relative to the outer elongated tube 202 so as to adjustably set a height of the connecting portion 149'. In some embodiments, the openings 206 and the recesses 208 may be uniformly sized and shaped such that each opening 206 is configured to align with any one of the recesses 208. The openings 206 and recesses 208 may have any suitable shape that is configured to engage and receive a portion of the locking portion 210 therein. In certain embodiments, the openings 206 and recesses 208 may be spaced apart by predetermined increments along the height of the connecting portion 149' such that the inner elongated component is slidably adjustable by the predetermined increments of height.

As discussed above, the body portion 104' may comprise a locking portion 210 for reversibly engaging and disengaging the openings 206 and recesses 208 of the extendable connecting portion 149'. The locking portion 210 may have any suitable shape. In one particular embodiment, the locking portion 210 may comprise a protrusion 212 that is sized and shaped to reversibly engage any one of the openings 206 and recesses 208 such that the inner elongated component 204 is positionally extendable and retractable and may be reversibly locked into place relative to the outer elongated tube 202. The locking portion 210 may be attached to the sliding plate 146' and configured to be movable between an open configuration, in which the locking portion 210 may be disengaged from the openings 206 and/or recesses 208, and a closed configuration, in which the locking portion 210 may be inserted through an opening 206 and received within a recess 208, such that the inner elongated component 204 is prevented from slidable motion relative to the outer elongated tube 202. In some embodiments, the connecting portion 149' may further include two round side processes that the locking portion 210 from disengaging from the sliding plate 146'.

In one exemplary embodiment, as shown in FIG. 27-29, the locking portion 210 may have a rectangular prism or cubical shape. The locking portion 210 may comprise a protrusion 212 having a rectangular prism or any suitable polygonal prism shape. The locking portion 210 may be attached to the sliding plate 146' by any suitable means such that it may be manually movable between the open and close configurations. The protrusion 212 of the locking portion 210 may function as a male processes of this locking mechanism by which it is inserted into its counterpart female process for the locking mechanism, which are the openings 206 and recesses 208. For example, the locking portion 210 may be sufficiently flexible such that the it can be manually deform to be in an open configuration and may be biased towards the connecting portion 149' such that upon alignment of the protrusion 212 with an opening 206 and a recess 208, the protrusion 212 engages the opening 206 and recess 208 such that the locking portion 210 is in the closed configuration. Alternatively, the locking portion 210 may be connected to the sliding plate 146' via a sliding mechanism such that the locking portion 210 is reversibly slidable between the open configuration and the closed configuration. When in use, the locking portion 210 may be manually moved to the open configuration and the inner elongated component 204 may be slidably adjustable relative to the outer elongated tube 202. In particularly the openings 206 and recesses 208 may be uniformly separated by a predetermined distance such that the height of the connecting portion 149' may be adjusted by incrementally by the predetermined distance. In particular, the inner elongated component 204 may be advanced incrementally by the predetermined distance. In some embodiments, the locking portion 210 may include more than one protrusion 212, particularly, the locking portion 210 may include two protrusions for engaging in counterpart openings 206 and recesses 208 on the extendible connecting portion 149.' Furthermore, each opening 206 and/or recess 208 may also be accompanied by a small metal bump or dimple. The small bump or dimple may serve as a mechanism for providing a clicking noise that provides the user an additional means for locating the openings 206 and/or recesses 208 and confirming that the protrusion 212 from the locking portion 210 is securely interlocked with an opening 206 and a recess 208.

According to an exemplary method, a plurality of bracket devices 100, 100' may be used to treat an orthodontic patient. A base portion 102, 102' for each bracket device 100, 100' may be adhered or otherwise attached to a tooth of the patient. Upon attachment of the base portion 102, 103' to the tooth, the body portion 104, 104' may be coupled to each base portion 102, 102' attached to a tooth. In some exemplary embodiments of the orthodontic devices 100, 100' shown in FIGS. 24-29, the sliding component 142, 142' and the external component 144 of the body portion 104, 104' are pre-assembled prior to attachment of the body portion 104, 104' to the base portion 102, 102'. The sliding plate 146, with the locking lever 134 of the base portion 102 in an open configuration, may be slid into the space 128 between the first and second rails 120, 124 of the base portion 102. Similarly, the sliding plate 146', with the locking portion 134' of the base portion 102' in an open configuration may also be slid into the the space 128' between the first and second rails 120', 124' of the base portion 102.' As described above, the body portion 104, 104' and the housing portion 105, 105' may be positioned relative to the base portion 102, 102' in a number of different positions. Once the body portion 104 and the housing portion 105 have been positioned as desired, the locking lever 134 is moved to the closed position so that the locking tab 140 thereof is moved into the opening 132 along the lateral surface 130 of the base portion 102 and into a desired one of the recesses 156 of the sliding plate 146, to fix the body portion 104 in the desired position relative to the base portion 102. Similarly, once the body portion 104' and the housing portion 105' have been positioned as desired, the locking portion 134' is moved to the closed position so that the protrusions 140' thereof are moved to engage the openings 132' of the base portion 102' in a desired configuration such that the body portion 104' is fixed in a desired position relative to the base portion 102.'

Once the body portion 104, 104' has been fixed relative to the base portion 102, 102', the bracket gate 176 may be moved to the open position so that a wire may be inserted into the channel 106 and the housing portion 105, 105' may be adjusted relative to the body portion 104,104', as desired. In addition, opening the bracket gate 176 moves the locking pins 162 to the unlocked position so that the housing portion 105, 105' may be moved relative to the body portion 104, 104', e.g., may be rotated about one, two or three different axes, to achieve a desired orientation and position therebetween. Once the desired orientation/position has been achieved, the bracket gate 176 may be closed to enclose the archwire in the channel 106 and to fix the housing portion 105, 105' relative to the body portion 104, 104'.

The orthodontic device described above generates sufficient force to adjust the positioning of the bracket device relative to the wire and does not require application of external forces. Accordingly, the orthodontic device as described herein provides a way to eliminate the need for an external source for adjustments to orthodontic braces. In particular, the orthodontic device eliminates the need for application of springs, power chains, power treads, or other sources of external forces, which have typically required constant replacement to compensate for their quick force decay and caused irritation to the patient, including application of an excessive force on anchor tooth or teeth. Furthermore, this device may eliminate the need for reactivation, which further streamlines adjustments to orthodontic braces and saves significant chair-side time for the orthodontist.

Figure 20:
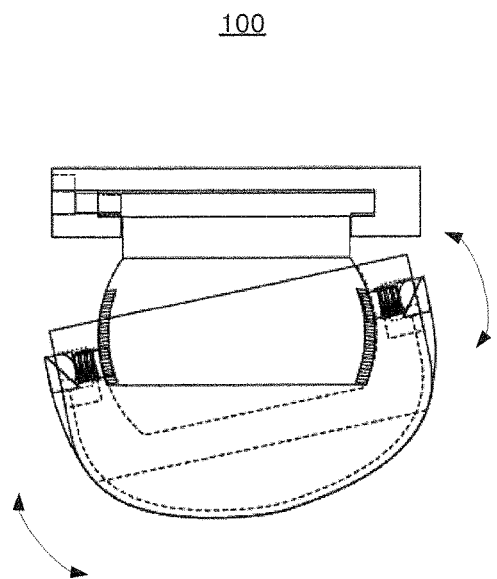
FIG. 20 shows a top view of the exemplary orthodontic bracket device of FIG. 1 indicating that an adjustable portion of the device is rotatable about a first axis.

The adjustable portion 101, 101' may be movable in at least three different directions or dimension relative to the base portion 102, 102'. For example, as shown in FIG. 20, the adjustable portion 101 may be rotatable (as indicated by the dotted arrows) about a first axis extending out of the page of a top view of the exemplary orthodontic bracket device 100 described herein. In particular, the housing portion 105 may be rotatable about the first axis relative to the body portion 104. In some embodiments, the housing portion 105 may be limited to a range of motion that is within a predetermined angle from the substantially planar component 103. For example, the adjustable portion 101 may be rotatable up to 90° away from the substantially planar component. Alternatively, the adjustable portion 101 may be rotatable up to 60°, 45°, 30° or 15° degrees away from the lateral surface 130. In an operative configuration where the base portion 102 of the orthodontic bracket device 100 may be affixed to a tooth of the patient, the first axis may extend along an apico-coronal direction of the tooth.

Figure 21:
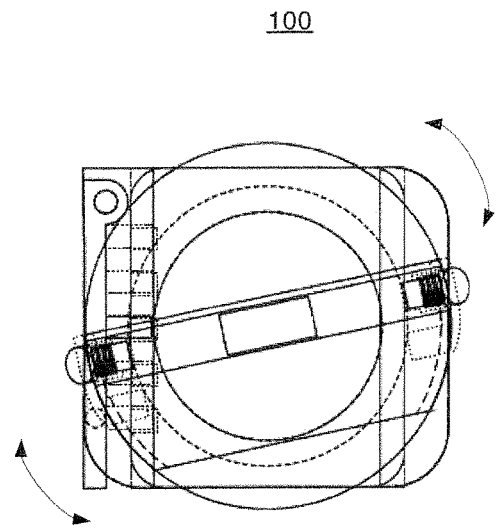
FIG. 21 shows a front view of the exemplary orthodontic bracket device of FIG. 1 indicating that an adjustable portion of the device is rotatable about a second axis.

As shown in FIG. 21, the adjustable portion 101 may be rotatable (as indicated by the dotted arrows) about a second axis extending out of the page of a front view of the exemplary orthodontic bracket device 100 described herein. In particular, the housing portion 105 may be rotatable about second axis relative to the body portion 104. In particular, the housing portion 105 may be rotatable about the second relative to the body portion 104. In some embodiments, the housing portion 105 may be freely rotatably about the second axis. In other embodiments, the housing portion 105 may be rotatable within a limited range of motion that is within a predetermined angle about the second axis. For example, the adjustable portion 101 may be rotabable up to 90° about the second axis. Alternatively, the adjustable portion 101 may be rotatable up to 60°, 45°, 30° or 15° degrees about the second axis. In an operative configuration where the base portion 102 of the orthodontic bracket device 100 may be affixed to a tooth of the patient, the second axis may extend along an bucco-palatal direction of the tooth.

Figure 22:
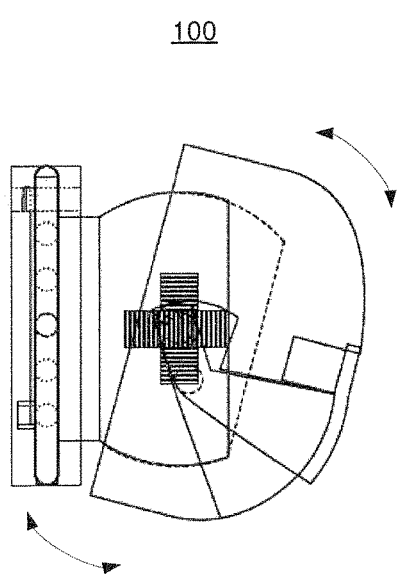
FIG. 22 shows a side view of the exemplary orthodontic bracket device of FIG. 1 indicating that an adjustable portion of the device is rotatable about a third axis.

As shown in FIG. 22, the adjustable portion 101 may be rotatable (as indicated by the dotted arrows) about a third axis extending out the page of a side view of the exemplary orthodontic bracket device 100 described herein. In particular, the housing portion 105 may be rotatable about the third axis relative to the body portion 104. In some embodiments, the housing portion 105 may be limited to a range of motion that is within a predetermined angle from the substantially planar component 103. For example, the adjustable portion 101 may be rotabable up to 90° away from the substantially planar component. Alternatively, the adjustable portion 101 may be rotatable up to 60°, 45°, 30° or 15° degrees away from the lateral surface 130. In an operative configuration where the base portion 102 of the orthodontic bracket device 100 may be affixed to a tooth of the patient, the third axis may extend along a mesial-distal direction of the tooth.

Figure 23:
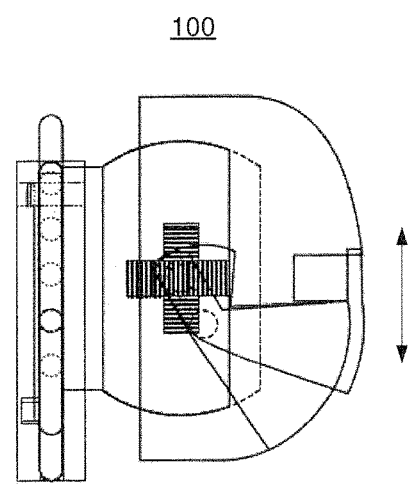
FIG. 23 shows a side view of the exemplary orthodontic bracket device of FIG. 1 indicating that an adjustable portion of the device is slidable along an apico-coronal direction of the tooth.

As shown in FIG. 23, the adjustable portion 101 may also be slidable (as indicated by the dotted arrows) in an up and down direction, which corresponds to an apico-coronal direction (as indicated by the dotted arrows) when the orthodontic bracket device 100 is affixed to a tooth of the patient in an operative configuration. In particular, the body portion 104 may be slidable relative to the base portion 102 of the orthodontic bracket device 100.

As discussed above, the adjustable portion 101 may be movable between a freely movable configuration and a locked configuration. Any suitable instrument may be used to unlock the adjustable portion 101 and/or manipulate either the archwire or the positioning, orientation or angulation/torque/tip or off set of the adjustable portion 101. For example, the instrument may be any instrument for manually manipulating either the archwire or the adjustable portion 101 in a desired configuration. Alternatively, the instrument may be a computer controlled instrument that receives information relating to the positioning of the eeth and calculates personalized adjustments for manipulating and adjusting each bracket.

In one particular embodiment, the instrument may be an orthodontic adjustment device having a communications device, e.g., a wireless communications device, for receiving from a processing arrangement output data corresponding to a desired adjustment to the tooth, the output data is generated by the processing arrangement based on input data corresponding to positioning of the tooth. The device may also include an engagement portion, which in an operative configuration may be reversibly connected to the orthodontic bracket for manipulating the adjustable portion 101 of the bracket. The engagement portion may have any suitable shape for reversibly engaging and disengaging the adjustment portion 101 of the bracket, for example, the engagement portion may comprise a two-prong fork configured to reversibly engage a locking mechanism on the adjustable portion 101. The locking mechanism may be reversibly movable between a first configuration and a second configuration wherein, when the locking mechanisms is in a first configuration, the adjustable portion 101 is freely movable and when the locking mechanism is in a second configuration, the adjustable portion 101 is fixed with respect to the tooth. The engagement portion of the adjustment device may move the locking mechanism to the first configuration when the engagement portion is connected to the bracket, and move the locking mechanism, to the second configuration when the engagement portion is disconnected from the bracket.

Additionally, the instrument may be suitable for moving the adjustable portion 101 about a first axis in an apico-corneal direction of a tooth when the device is in use, a second axis in a buccopalatal direction of the tooth and/or a third axis in a mesial distal direction of the tooth. The device may include an adjustment mechanism that is configured to move the engagement portion based on the output data, such that in an operative configuration the engagement portion rotatably moves the adjustable portion 101 about the first axis, the second axis, and/or the third axis to induce movement of the tooth corresponding to the desired adjustment, which may correspond to a direction and/or a magnitude of a force to be applied to the tooth. In one exemplary embodiment, the adjustment mechanism may include a first hinge rotatable about a first hinge axis, a second hinge rotatable about a second hinge axis, the second hinge axis being substantially perpendicular to the first hinge axis, and a third hinge rotatable about a third hinge axis, the third hinge axis being substantially perpendicular to the first hinge axis and the second hinge axis. When in use, the motion about the first hinge axis of the adjustment mechanism corresponds to a motion of the adjustable portion 101 about the first axis in an apico-corneal direction of a tooth when the device is in use, the motion about the second hinge axis of the adjustment mechanism corresponds to a motion of the adjustable portion 101 about the second axis in a buccopalatal direction of the tooth, and the motion about the third hinge axis of the adjustment mechanism corresponds to a motion of the adjustable portion 101 about the a third axis in a mesial distal direction of the tooth. These three rotatory hinges may allow precise and control rotation of the engagement portion in three different dimensions and therefore impart rotation of each orthodontic bracket in those dimensions.

The orthodontic adjustment device may include additional functionalities such as a vibration mechanism configured to administer a mechanical vibration to the tooth.

An orthodontic system may include a plurality of uniformly sized brackets such as those discussed above and an archwire which in an operative configuration is connected to the plurality of brackets. The system may also include an external dental imaging device that collects input data corresponding to the positioning of each corresponding teeth. The external dental imaging device may provide the input data to the processing arrangement for analysis and generating output data, as discussed above In one exemplary embodiment, the instrument may comprise a robotic device, such as an robotic arm configured to receive input data corresponding to the positioning of each corresponding teeth and manipulate each bracket based on the input data. The input data may be obtained and generated by an external imaging device, for example an image scan of the teeth of the patient using a commerically available dental imaging scanner and then transmitting the image data as the input data to a processing arrangement, such as a computer. The processing arrangement may contain computing modules or instructions for analyzing the input data and/or provide an interface with a clinician, e.g., a virtual model of the patient's teeth, for displaying the input data and receiving instructions from the clinician for adjusting the positioning of each tooth The processing arrangement may obtain the input data and the clinician's instructions and generate an output for adjustments to be made to each of the orthodontic brackets. More particularly, the processing arrangement may divide each of the movements into smaller movements for each tooth. The information may be transferred from the processing arrangement to the adjustment device via a wired connection (e.g., cable) or a wireless communications network (e.g., Bluetooth).

The robotic device may include a display screen. The display screen may be positioned on a surface of the robot device that provides information relating to each tooth that is being targeted for movement. For example, the clinical may use the display screen to select the target tooth from a plurality of teeth imaged from the patient. If the clinician decides to change the desired movements of the teeth based on progress of the patient, the clinician may change the desired movement in the display screen. The adjusted input may be used to provide an adjusted output, which may then be transferred to the adjustment device to provide an updated movement to be imparted by the adjustment device to the orthodontic brackets on the teeth of the patient. Based on the tooth selected by the clinician and the output data calculated by the processing arrangement and transferred of the device, the selected movements of adjustment mechanism about the first, second and third hinge axes may be determined. The clinician may guide the robotic device to the orthodontic bracket on the target tooth and trigger, e.g., by pressing a trigger button, the robotic device to manipulate the bracket and/or connecting archwire to the targeted tooth In a further aspect, an orthodontic systems having a plurality of orthodontic bracket, such as those described herein may further comprise a plurality of sensors collecting input data corresponding to the orientation or positioning of each of the brackets. The sensors may be external to the brackets or within each of the brackets. In addition, at least one of the brackets may include a sensor having an additional module. The additional module may be selected from a group consisting of a Global Positioning System (GPS) module, an identifier module, and a vibration module.

The orthodontic system may further include a communications device, e.g., a wireless communications device, transmitting the input data to a processing arrangement and receiving output data corresponding to a desired adjustment to the teeth from the processing arrangement, and a plurality of electromagnetic generators generating electromagnetic forces based on the output data, each of the electromagnetic generators attracting or repelling at least one of the brackets to induce movement of the teeth corresponding to the desired adjustment. Each of the brackets may comprise a metallic component configured to be attracted to or repelled by at least one of the electromagnetic generators. The system may further include an external aligner configured to removably fit over the teeth. The plurality of sensors and/or the communications device may be attached to the external aligner. The external aligner may further include a power source and/or the electromagnetic generators.

The processing arrangement may analyze the input data to determine the output data based on the input data. The processsing arrangement may also comprise a user interface displaying the input data to a user, and obtaining user data from the user. The output data may be generated by the processing arrangement based on the input data and the user data. The desired adjustment may correspond to one of a direction and a magnitude of a force to be applied to at least one of the teeth.

The processing arrangement may be, e.g., entirely or a part of, or include, but not limited to, a computer/processor that can include, e.g., one or more microprocessors, and use instructions stored on a computer-accessible medium (e.g., RAM, ROM, hard drive, or other storage device). A computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium may be a non-transitory computer-accessible medium. The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes and instructions, as described herein.

In addition, a method for adjusting orthodontic braces for aligning teeth of a patient may be provide. The orthodontic braces may have a plurality of brackets attached to the teeth and connected by an arch wire. The method may comprise receiving, from a plurality of sensors or an external dental imaging device, input data corresponding to positioning of the teeth, transmitting the input data to a processing arrangement, receiving output data corresponding to a desired adjustment to the teeth from the processing arrangement, and generating, via a plurality of electromagnetic generators, electromagnetic forces based on the output data o attract or repel the plurality of brackets to induce movement of the teeth corresponding to the desired adjustment. The desired adjustment may correspond to either a direction and/or magnitude of a force to be applied to at least one of the teeth.

Furthermore, a method for adjusting orthodontic braces for aligning teeth of a patient may be provided. The orthodontic brace may have a plurality of uniform brackets connected by an archwire. Each bracket may be configured to be attached to a corresponding tooth. The method may comprise receiving, from a plurality of sensors or an external dental imaging device, input data corresponding to positioning of each corresponding tooth, generating output data corresponding to a desired adjustment for each corresponding tooth, and transmitting the output data to an adjustment device which in an operable configuration reversibly engages each bracket and rotatably moves a movable portion of each bracket about at least one of a first axis, a second axis, and a third axis based on the output data to induce movement of each corresponding tooth to the desired adjustment, the first axis being in an apico-corneal direction of the corresponding tooth, the second axis being in a buccopalatal direction of the corresponding tooth, and the third axis being in a mesial distal direction of each of the corresponding tooth. The desired adjustment may correspond to either a direction and/or magnitude of a force to be applied to at least one of the teeth.

The invention described and claimed herein is not to be limited in scope by the specific embodiments herein disclosed since these embodiments are intended as illustrations of several aspects of this invention. Any equivalent embodiments are intended to be within the scope of this invention.

Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed is:

1. An orthodontic bracket for a tooth comprising:
a housing portion having a first groove extending from a first end to a second end through the housing portion, the first groove configured to slidably receive an archwire therethrough;
a body portion configured to be received within the housing portion, wherein the housing portion is configured to rotatably mount to the body portion about a first axis, a second axis, and a third axis, the first axis being in an apico-coronal direction of the tooth, the second axis being in a buccopalatal direction of the tooth, and the third axis being in a mesial-distal direction of the tooth; and
a base portion configured to attach to a surface of the tooth, wherein the body portion is configured to slidably mount to the base portion, and wherein the body portion is configured to slidably extend and retract along the second axis so that the housing portion reversibly moves away from and towards the base portion in the buccopalatal direction,
wherein the body portion is configured to slidably mount on the base portion along the apico-coronal direction of the tooth,
wherein a first portion of the body portion has a plate shape, and a second portion of the body portion has a substantially circular cross-section along a plane axial to the tooth, the second portion being attached to the first portion, and
wherein the body portion comprises a plurality of locking bores along a side of the first portion, and the base portion comprises a locking mechanism configured to reversibly engage one of the plurality of locking bores.

2. The orthodontic bracket of claim 1, wherein the housing portion comprises a bracket configured to be movable between an open configuration in which the archwire is removable from the housing portion and a closed configuration in which the housing portion surrounds a cross-sectional circumference of the archwire.

3. The orthodontic bracket of claim 1, wherein the second portion of the body portion has a semispherical shape.

4. The orthodontic bracket of claim 1, wherein the second portion of the body portion comprises a telescoping portion configured to reversibly extend and retract in a buccopalatal direction.

5. The orthodontic bracket of claim 1, wherein the base portion comprises a second groove and a third groove, the second and third grooves configured to slidably receive the first portion of the body portion therein, along the apico-coronal direction of the tooth.

6. The orthodontic bracket of claim 1, wherein the housing portion receives at least of the second portion of the body portion therein.

7. The orthodontic bracket of claim 1, wherein the body portion comprises a T-shaped engagement and the housing portion comprises a locking bore, the orthodontic bracket further comprising a locking mechanism configured to reversibly engage the T-shaped engagement and the locking bore of the housing portion.

8. The orthodontic bracket of claim 1, further comprising a locking mechanism received within an interior of the housing portion and is reversibly movable between a first configuration and a second configuration, wherein, when the locking mechanism is in a first configuration, the housing portion is movable relative to the body portion, and when the locking mechanism is in a second configuration, the housing portion is fixed at a desired position relative to the body portion.

9. The orthodontic bracket of claim 2, wherein the bracket comprises an opening configured to receive a manipulating device for mechanically manipulating the archwire by moving the archwire to impact at least one of a force and moment on the tooth when the bracket is in a closed configuration.

10. The orthodontic bracket of claim 1, wherein the locking mechanism is a locking lever comprising a locking pin sized and shape to reversibly engage one of the plurality of locking bores.

11. The orthodontic bracket of claim 1, wherein the housing portion receives at least a portion of the body portion therein.

12. The orthodontic bracket of claim 7, wherein the locking mechanism comprises a locking pin and a spring configured to receive the locking pin therethrough.

13. The orthodontic bracket of claim 8, wherein the locking mechanism comprises a flexible spring received within the interior of the housing portion, the flexible spring being disengaged from the body portion in the first configuration, and frictionally engaged to the body portion such that the housing portion is frictionally fixed to the desired position.

14. An orthodontic system, comprising:
a plurality of identical orthodontic brackets, each bracket comprising (i) a housing portion having a first groove extending from a first end to a second end through the housing portion, and (ii) a body portion configured to be received within the housing portion, wherein the housing portion is configured to rotatably mount to the body portion about a first axis, a second axis, and a third axis, the first axis being in an apico-coronal direction of the tooth, the second axis being in a buccopalatal direction of the tooth, and the third axis being in a mesial-distal direction of the tooth, wherein each of the plurality of brackets is configured to be attached to a tooth of a patient, wherein the body portion is configured to slidably mount on the base portion along the apico-coronal direction of the tooth, wherein a first portion of the body portion has a plate shape, and a second portion of the body portion has a substantially circular cross-section along a plane axial to the tooth, the second portion being attached to the first portion and has a semispherical shape, and wherein the body portion comprises a plurality of locking bores along a side of the first portion, and the base portion comprises a locking mechanism configured to reversibly engage one of the plurality of locking bores;
a flexible archwire configured to be slidably received within the first groove of the housing portion; and
a base portion configured to attach to a surface of the tooth, wherein the body portion is configured to slidably mount to the base portion, and wherein the body portion is configured to slidably extend and retract along the second axis so that the housing portion reversibly moves away from and towards the base portion in the buccopalatal direction.

15. The orthodontic system of claim 14, further comprising:

an adjustment device configured to rotatably adjust the housing portion of each of the plurality of brackets about the first, second and third axes of each of the plurality of brackets.

* * * * *

UNITED STATES PATENT AND TRADEMARK OFFICE
CERTIFICATE OF CORRECTION

| | |
|---|---|
| PATENT NO. | : 11,197,741 B2 |
| APPLICATION NO. | : 16/082888 |
| DATED | : December 14, 2021 |
| INVENTOR(S) | : Alikhani et al. |

Page 1 of 1

It is certified that error appears in the above-identified patent and that said Letters Patent is hereby corrected as shown below:

In the Specification

Column 1, after Line 3, please insert the following:
--GOVERNMENT FUNDING
This invention was made with government support under Grant Nos. DE017426 and AR046121 awarded by The National Institutes of Health. The government has certain rights in the invention.--

Signed and Sealed this
Twenty-first Day of November, 2023

Katherine Kelly Vidal
*Director of the United States Patent and Trademark Office*